(12) United States Patent
Kato et al.

(10) Patent No.: US 8,089,245 B2
(45) Date of Patent: Jan. 3, 2012

(54) NONCONTACT CHARGING DEVICE WITH TEMPERATURE DETECTION

(75) Inventors: Hiroshi Kato, Kanagawa (JP); Kuniharu Suzuki, Tokyo (JP); Katsuya Suzuki, Gunma (JP); Manabu Yamazaki, Kanagawa (JP); Yoichiro Kondo, Nagano (JP); Kota Onishi, Aichi (JP); Kentaro Yoda, Nagano (JP); Mikimoto Jin, Nagano (JP); Takahiro Kamijo, Nagano (JP); Haruhiko Sogabe, Nagano (JP)

(73) Assignees: Sony Ericsson Mobile Communications Japan, Inc., Tokyo (JP); Seiko Epson Corporation, Tokyo (JP)

( * ) Notice: Subject to any disclaimer, the term of this patent is extended or adjusted under 35 U.S.C. 154(b) by 645 days.

(21) Appl. No.: 12/007,073

(22) Filed: Jan. 7, 2008

(65) Prior Publication Data

US 2008/0164839 A1 Jul. 10, 2008

(30) Foreign Application Priority Data

Jan. 9, 2007 (JP) ................................. 2007-001644

(51) Int. Cl.
*H02J 7/00* (2006.01)
(52) U.S. Cl. ................. 320/108; 336/200; 336/223
(58) Field of Classification Search .................. 320/108
See application file for complete search history.

(56) References Cited

U.S. PATENT DOCUMENTS

| | | | |
|---|---|---|---|
| 5,321,572 A * | 6/1994 | Shibui et al. ..................... 361/38 |
| 5,576,224 A * | 11/1996 | Yakura et al. .................. 438/381 |
| 6,208,528 B1 * | 3/2001 | Soto et al. ........................ 363/15 |
| 2002/0056233 A1 * | 5/2002 | Gohara ............................ 49/360 |
| 2003/0020583 A1 * | 1/2003 | Hui et al. ....................... 336/200 |
| 2004/0074086 A1 * | 4/2004 | Yamaguchi et al. ............ 29/745 |
| 2005/0212640 A1 * | 9/2005 | Chiang et al. .................. 336/200 |
| 2007/0101893 A1 * | 5/2007 | Shalev et al. .................. 102/512 |

FOREIGN PATENT DOCUMENTS

| | | |
|---|---|---|
| EP | 0 674 354 A2 | 9/1995 |
| JP | 07-263935 A | 10/1995 |
| JP | 2001-258182 A | 9/2001 |
| JP | 2003-153457 | 5/2003 |
| JP | 2004-208383 A | 7/2004 |

* cited by examiner

*Primary Examiner* — Arun Williams
(74) *Attorney, Agent, or Firm* — Rader, Fishman & Grauer PLLC

(57) ABSTRACT

A noncontact charging device includes a mounting portion, a primary transmission coil, a temperature-detecting element, and a control unit. A device charged in a noncontact manner is mounted on the mounting portion. The primary transmission coil supplies power to a secondary transmission coil provided to the device by the use of electromagnetic induction. The temperature-detecting element detects a temperature of a material mounted on the mounting portion. The control unit is configured to supply power to the primary transmission coil and terminate the power supply to the primary transmission coil when a predetermined temperature is detected by the temperature-detecting element. The temperature-detecting element is located on a side of a contact surface between the mounting portion and the primary transmission coil, and the center of the temperature-detecting element is located within a range of the diameter of the primary transmission coil from the center position of the primary transmission coil.

6 Claims, 14 Drawing Sheets

FIG. 12A
| Side Length | Area | 0sec | 30sec | 60sec | 90sec | 120sec | 180sec |
|---|---|---|---|---|---|---|---|
| 3mm | 9mm² | 30°C | 36.4°C | 39°C | 40.5°C | 42.2°C | 43.9°C |
| 5mm | 25mm² | 30°C | 49.1°C | 54.5°C | 57.2°C | 58.4°C | 61.9°C |
| 6mm | 36mm² | 30°C | 57.7°C | 61.5°C | 63.7°C | 65.8°C | 70.1°C |
| 7mm | 49mm² | 30°C | 66.2°C | 77.1°C | 81.1°C | 80.9°C | 85.2°C |
| 8mm | 64mm² | 30°C | 73.3°C | 83.1°C | 89.7°C | 93.5°C | 100.6°C |
| 10mm | 100mm² | 30°C | 82.1°C | 96.2°C | 107.1°C | 109.1°C | 112.4°C |
| 12mm | 141mm² | 30°C | 113.2°C | 127.7°C | 130.2°C | 128.4°C | 143.1°C |
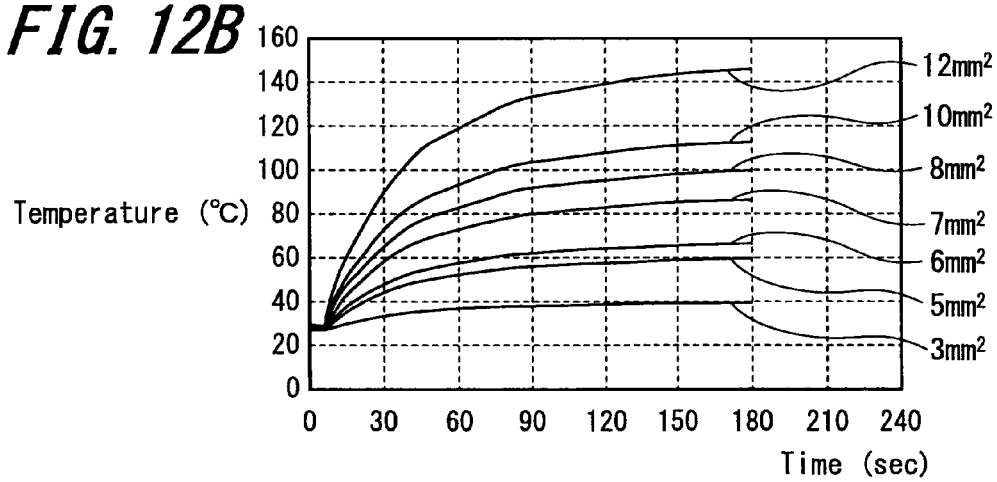
FIG. 12B
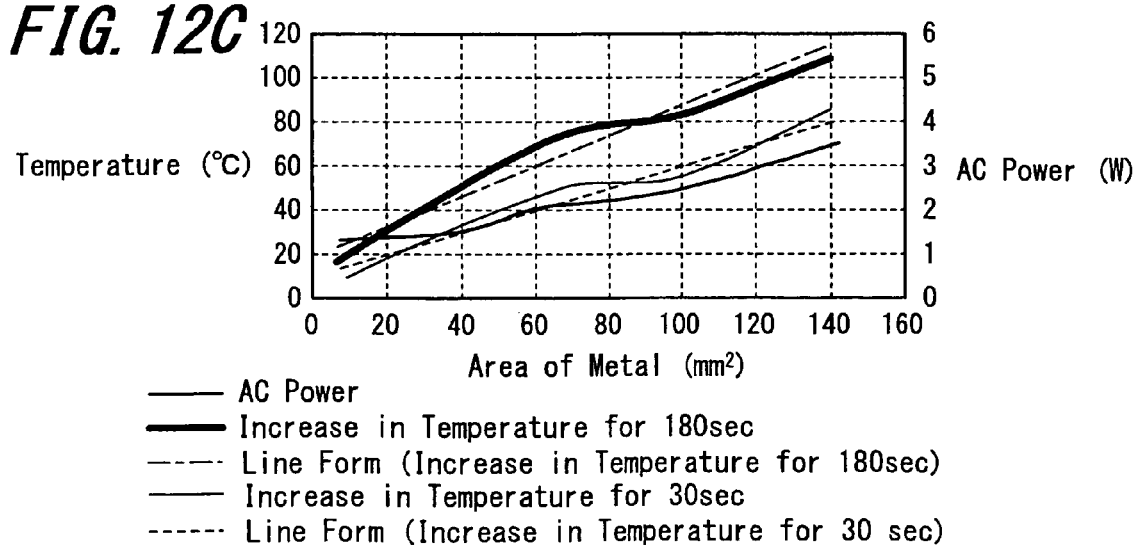
FIG. 12C
— AC Power
— Increase in Temperature for 180sec
--- Line Form (Increase in Temperature for 180sec)
— Increase in Temperature for 30sec
----- Line Form (Increase in Temperature for 30 sec)

|  |  |  | Distance of Metal | | | | |
|---|---|---|---|---|---|---|---|
| Side Length | Area |  | 2mm | 4mm | 6mm | 8mm | 10mm |
| 10mm | 100mm² | Metal Temperature | 148°C | 112°C | 58°C | 52°C | 48°C |
| | | Sensor Temperature | 121°C | 98°C | 48°C | 48°C | 42°C |
| 25mm | 625mm² | Metal Temperature | 153°C | 139°C | 117°C | 76°C | 53°C |
| | | Sensor Temperature | 125°C | 118°C | 104°C | 52°C | 41°C |

FIG. 14A

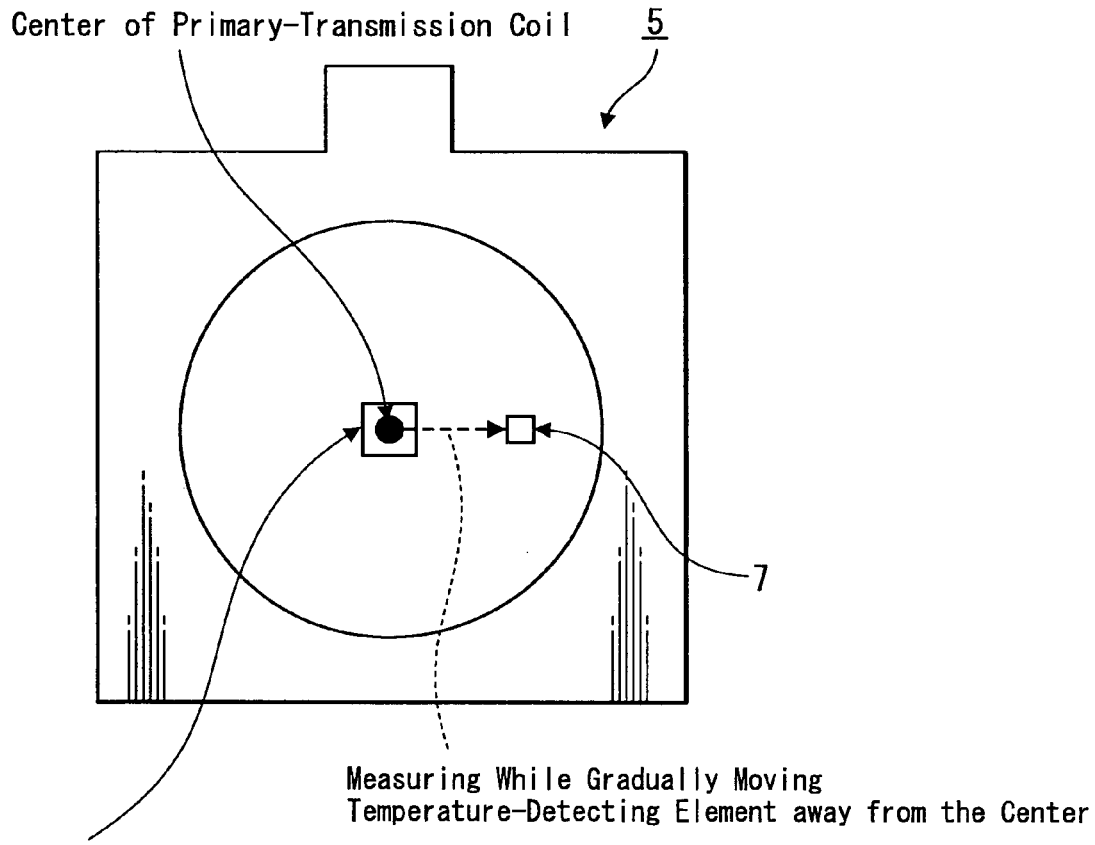

Center of Primary-Transmission Coil

Measuring While Gradually Moving Temperature-Detecting Element away from the Center Foreign Metallic Substance Fixed in the Central Position

FIG. 14B

| Side Length | Area | Metal Temperature | Distance of Temperature-Detecting Element ||||| 
|---|---|---|---|---|---|---|---|
| | | | 2mm | 4mm | 6mm | 8mm | 10mm |
| 7mm | 49mm² | 85.2°C | 76°C | 73°C | 71°C | 60°C | 50°C |
| 10mm | 100mm² | 112.4°C | 98°C | 93°C | 93°C | 62°C | 50°C |
| 15mm | 225mm² | 143.1°C | 131°C | 129°C | 116°C | 98°C | 61°C |
| 25mm | 625mm² | 153.1°C | 129°C | 134°C | 128°C | 98°C | 89°C |
| | | | Temperature Detected by Temperature-Detecting Element |||||

Foreign Metal Substance

Temperature-Detecting Element Arranged with the Center thereof Located within Diameter of Primary-Transmission Coil Diameter of Primary-Transmission Coil

NONCONTACT CHARGING DEVICE WITH TEMPERATURE DETECTION

CROSS-REFERENCES TO RELATED APPLICATIONS

The present invention contains subject matter related to Japanese Patent Application JP 2007-001644, filed in the Japanese Patent Office on Jan. 9, 2007, the entire contents of which are acquired herein by reference.

BACKGROUND OF THE INVENTION

1. Field of the Invention

The present invention relates to a noncontact charging device suitable for applying to a device used for charging portable devices, such as personal handy-phone systems (PHSs), personal digital assistants (PDAs), portable game devices, and notebook-sized personal computers. In particular, the present invention relates to a noncontact charging device designed to improve the safety of noncontact charging. Accordingly, a temperature-detecting unit detects a surface temperature of a primary coil (a coil on the side of the noncontact charging device) and when the surface temperature reaches a predetermined temperature or more, power transmission is terminated. In this case, the temperature-detecting unit for such detection is installed at a position when a foreign material, such as a metal, is placed on the noncontact charging device. The position is being adjusted depending on the size of the foreign material and the location thereof being placed.

2. Description of the Related Art

Japanese Unexamined Patent Application Publication No. 2003-153457 (page 4, FIG. 3) discloses a noncontact charging device. According to the charging device, a device charged may be prevented from an increase in temperature while shortening a charging time. In addition, according to the charging device, an abnormal increase in temperature, when a foreign metal substance is placed on a charging portion, may be prevented.

The noncontact charging device has a temperature sensor which detects temperature of a power transmission coil. When the temperature detected by the temperature sensor is not more than a predetermined temperature, a charge control circuit controls a charging current to increase. In contrast, when the temperature detected by the temperature sensor exceeds the predetermined temperature, the charge control circuit controls a charging current to reduce.

Accordingly, when the temperature detected by the temperature sensor is low, a charging time can be reduced by increasing a charging current. In addition, if a foreign metal substance such as a coin is placed on a charging portion to increase the temperature of a power transmission coil, an abnormal increase in temperature of the foreign metal substance can be prevented from occurring by lowering the charging current.

SUMMARY OF THE INVENTION

However, in the case of a noncontact charging device as disclosed in Japanese Unexamined Patent Application Publication No. 2003-153457, although the charging current is lowered, the flow of charging current continues even when the temperature of the power transmission coil reaches a predetermined temperature or more. As a result, it leads to an increase in time until the temperature of the foreign metal substance begins to decrease, and a time to prevent the foreign metal substance from an abnormal increase in temperature may increase.

Furthermore, an increase in temperature in the foreign metal substance, such as a coin, due to being placed on the charging portion extensively relates to both the size of the foreign metal substance and the location of the foreign metal substance being placed on the charging portion. In other words, when the foreign metal substance is of a predetermined size or less or when the mounted foreign metal substance is located away from a power transmission coil at a predetermined distance or more, the foreign metal substance may cause a small increase in temperature. Thus, an abnormal increase in temperature as described above may not occur. Therefore, the temperature sensor for detecting the temperature of a power transmission coil may not only require the contact with the power transmission. Anything important is the location of the temperature sensor to be placed.

It is desirable to provide a noncontact charging device capable of detecting the temperature of a power transmission coil (primary coil) by selecting the position of a temperature sensor mounted on the power transmission coil to be optimum. Using the noncontact charging device, an abnormal increase in temperature of a foreign metal substance or the like can be promptly controlled to assure the enhanced safety of the noncontact charging device.

According to an embodiment of the present invention, there is provided a noncontact charging device. The noncontact charging device includes a mounting portion, a primary transmission coil, a temperature-detecting element, and a control unit. A device charged in a noncontact manner is mounted on the mounting portion of the charging device. The primary transmission coil supplies power to a secondary-transmission circuit provided to the charged device by the use of electromagnetic induction. The temperature-detecting element is provided for detecting a temperature of a material mounted on the mounting portion. The control unit controls the supply of power to the primary transmission coil and the supply of power to the primary transmission coil to be terminated when a predetermined temperature is detected by the temperature-detecting element.

According to the embodiment, the temperature-detecting element is located on the side of a contact surface between the mounting portion and the primary transmission coil and the center of the temperature-detecting element is located within a range of not more than the diameter of the primary transmission coil from the center position of the primary transmission coil.

According to the embodiment of the present invention as described above, the temperature-detecting element is mounted on the optimal position. Thus, an increase in temperature of a material mounted on the mounting portion can be correctly detected and the supply of power to the primary transmission coil can be terminated under control without delay.

According to the noncontact charging device of the embodiment of the present invention, the temperature-detecting element provided to the optimal position correctly detects an abnormal increase in temperature of a material mounted on the mounting portion. Subsequently, the supply of power to the primary transmission coil can be terminated without delay under control. Therefore, the safety of the noncontact charging device to which an embodiment of the present invention is applied can be improved.

BRIEF DESCRIPTION OF THE DRAWINGS

FIGS. 12A to 12C are diagrams illustrating the relationship between the area of a foreign metal substance mounted on a cradle 1 and an increase in temperature, where FIG. 12A is a table representing the relationship between the areas of the respective foreign metal substances and the different durations of current applied to the primary transmission coil, FIG. 12B is a graphical representation of increases in temperatures regarding sizes (areas) of a metal, and FIG. 12C is a graphical representation of the relationship between the size (area) of the metal and an increase in temperature.

FIG. 13A is a schematic front view of a primary transmission coil and FIG. 13B is a table that represents the saturated temperatures of the respective foreign metal substances and the temperatures detected by the temperature-detecting element.

FIGS. 14A and 14B are diagrams for illustrating the relationship between the position of a temperature-detecting element set on the cradle 1, where FIG. 14A is a schematic front view of a primary transmission coil and FIG. 14B is a table that represents the saturated temperatures of the foreign metal substance and the temperatures thereof detected for each area by the temperature-detecting element.

FIG. 14A is a schematic front view of a primary transmission coil and FIG. 15B is a table that represents the temperatures of the foreign metal substance and the temperatures detected for respective measurement points by the temperature-detecting element.

FIG. 16A is a schematic cross-sectional view of the cradle 1, FIG. 15B is a schematic front view of the primary transmission coil, and FIG. 16C is a schematic front view of the primary transmission coil.

DESCRIPTION OF THE PREFERRED EMBODIMENTS

An embodiment of the present invention may be applied to a cradle that charges a battery installed in a mobile phone unit.

[Configurations of Cradle and Mobile Phone Unit]

Figure 1:
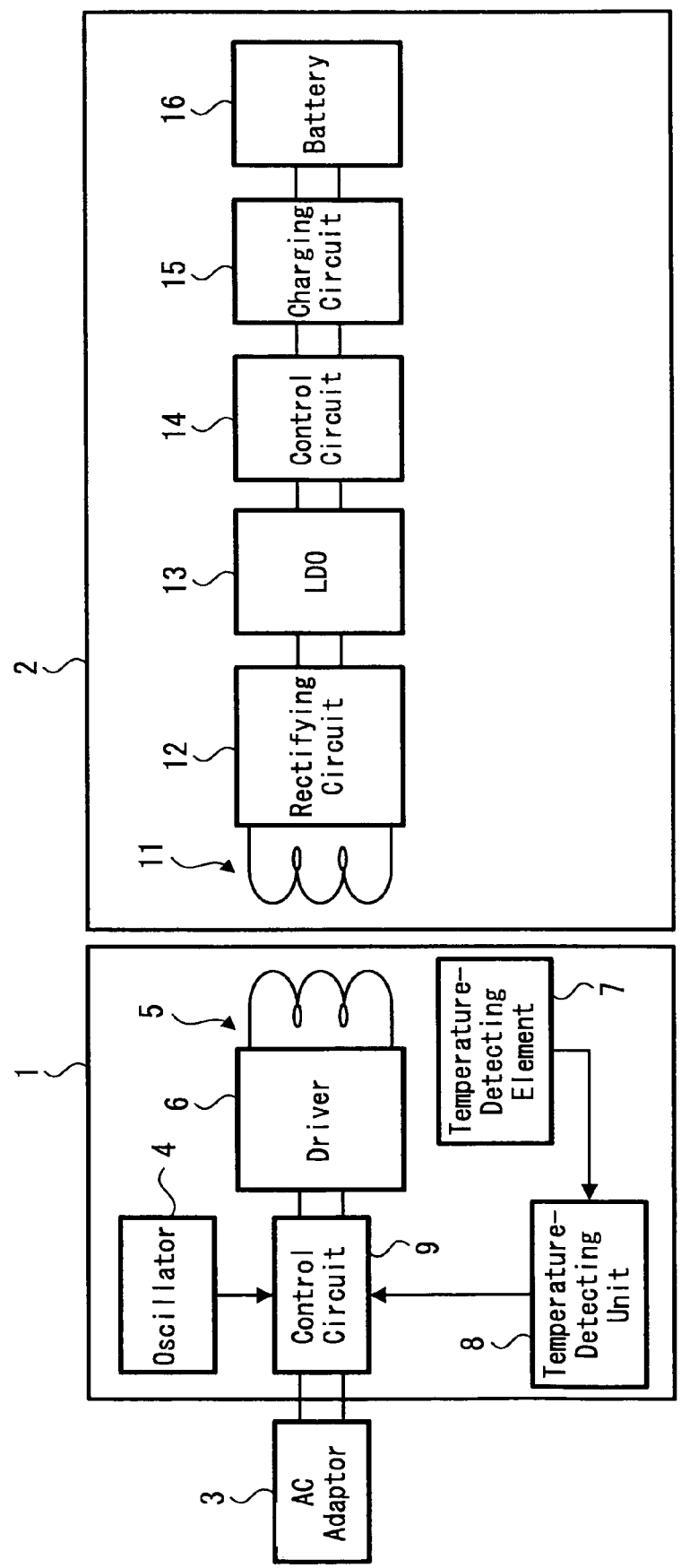
FIG. 1 is a block diagram schematically illustrating a main part of a cradle according to an embodiment of the present invention and a main part of a mobile phone unit mounted on the cradle.

FIG. 1 is a block diagram that illustrates a cradle 1 in accordance with an embodiment of the present invention and a mobile phone unit 2. The mobile 2 can be mounted on the cradle 1 to charge a secondary cell (also simply referred to as a battery) installed in the mobile phone unit 2.

As shown in FIG. 1, the cradle 1 of the present embodiment includes an AC (alternating current) adaptor 3, an oscillator 4, a primary transmission coil 5, a driver 6, a temperature-detecting element 7, and a temperature-detecting unit 8. The AC adaptor 3 is provided for converting consumer power supply into direct-current (DC) power supply. The oscillator 4 is provided for oscillation at a predetermined frequency. The primary transmission coil 5 is provided as a noncontact power-transmission coil on the power transmission side. The drive 6 is provided for supplying an AC power to the primary transmission coil 5. The temperature-detecting element 7 is mounted on the optimal position (described later) of the primary transmission coil 5 so as to be in contact with the primary transmission coil 5. The temperature-detecting unit 8 is provided for detecting the temperature of the primary transmission coil 5 on the basis of an output of the temperature detection from the temperature-detecting element 7.

The cradle 1 further includes a control circuit 9 for terminating the charging under control as follows. The control circuit 9 coverts a DC power from the AC adaptor 3 into an AC power on the basis of an oscillation frequency signal from the oscillator 4 and supplies the AC power to the primary transmission coil 5 through the driver 6. When the temperature-detecting unit 8 detects an abnormal increase in temperature of the primary transmission coil 5, the control circuit terminates the supply of power to the primary transmission coil 5.

In contrast, the mobile phone unit 2 includes a secondary-transmission coil 11, a rectifying circuit 12, a LDO (low dropout) regulator 13, a charging circuit 15, and a control circuit 14. The secondary-transmission coil 11 is provided as a noncontact power-transmission coil on the power-receiving side. The rectifying circuit 12 is provided for converting an AC power received from the primary transmission coil 5 to a DC power. The LDO regulator 13 is provided for converting a DC power from the rectifying circuit 12 to a DC power at a predetermined voltage. The charging circuit 15 is provided for carrying out the charging by supplying the DC power at a predetermined voltage to a battery (secondary cell) 16. The control circuit 14 is provided for supplying the DC power at the predetermined circuit 15 to the charging circuit 15.

[Configuration of Noncontact Power-Transmission Coil]

Figure 2:
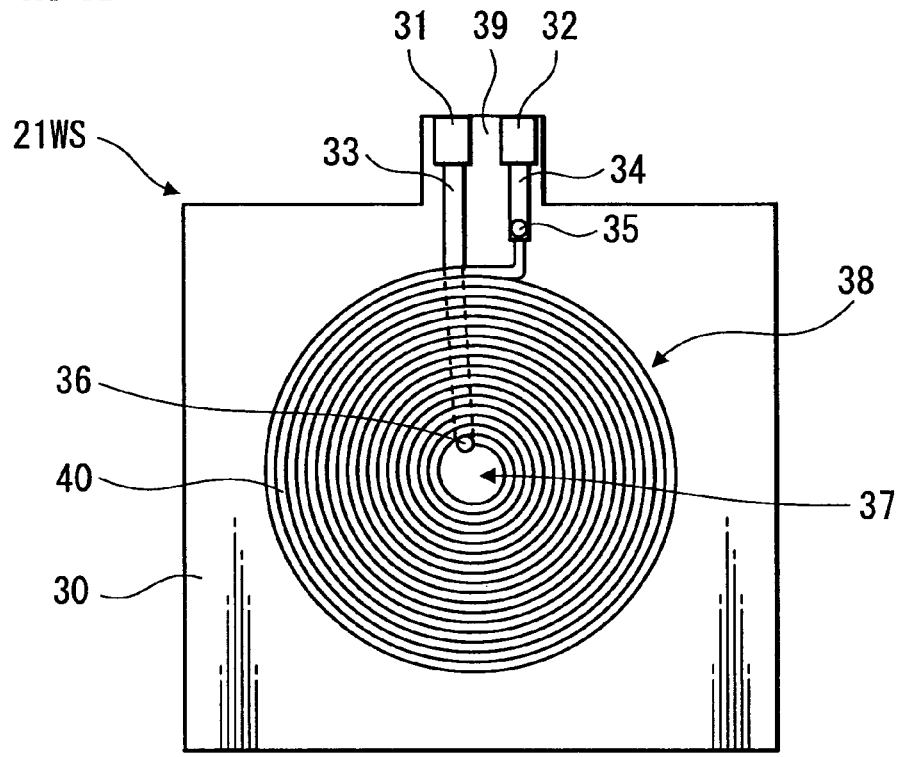
FIG. 2 is a schematic front view of a noncontact power-transmission coil where a planar coil made of a spirally-wound electric wire is stuck on a flexible printed-circuit board.
Figure 3:
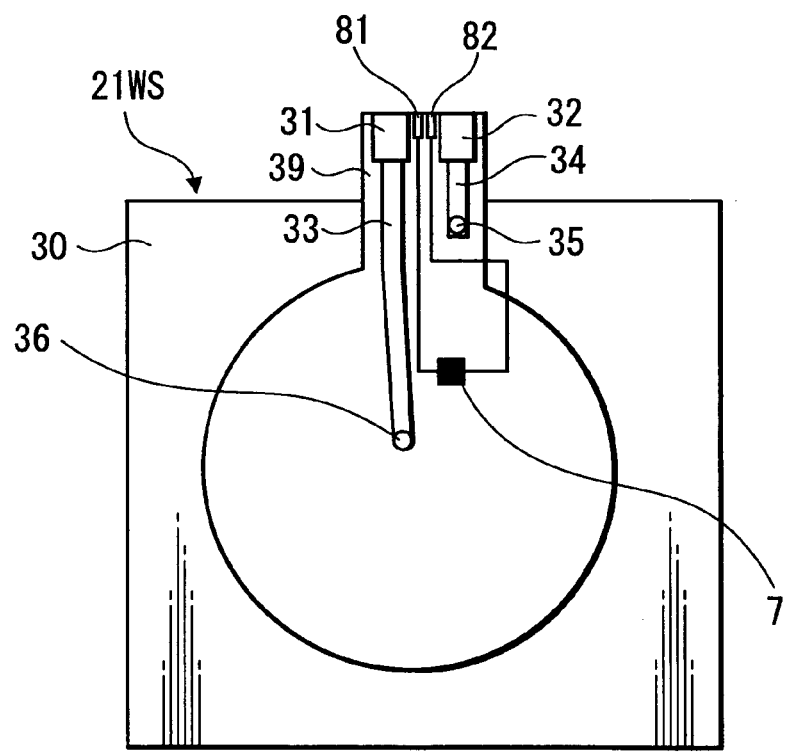
FIG. 3 is a schematic front view of the noncontact power-transmission coil where the planar coil shown in FIG. 2 is not stuck on the flexible printed-circuit board.
Figure 4:
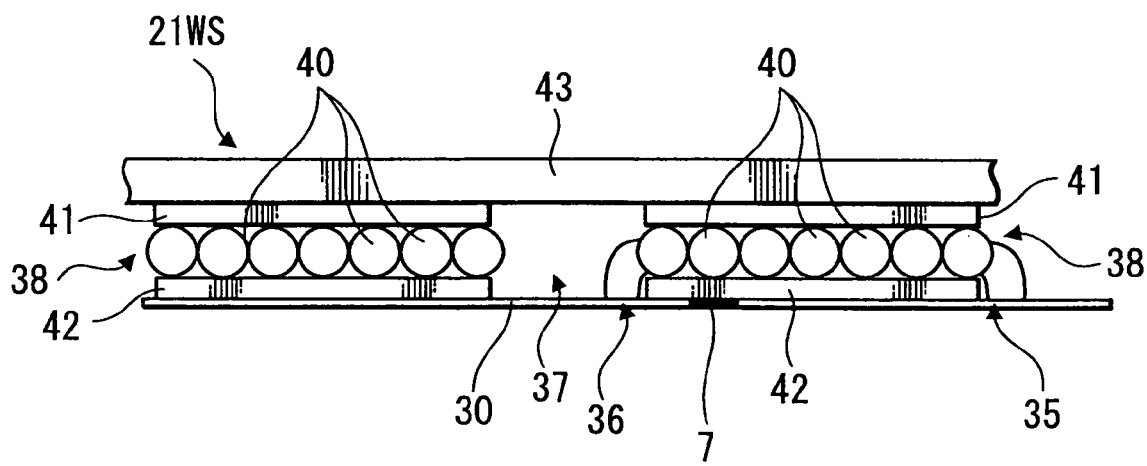
FIG. 4 is a schematic cross-sectional view of the noncontact power-transmission coil shown in FIG. 2.

FIGS. 2 to 4 illustrate the configuration of the primary transmission coil 5, which is the noncontact power-transmission coil on the power transmission side. These figures also illustrate the configuration of the secondary-transmission circuit 11, which is the noncontact power-transmission coil on the power receiving side. In other words, each of the primary transmission coil 5 and the secondary-transmission circuit 11 may be equivalently represented as a "noncontact power-transmission coil 21WS". Therefore, FIG. 2 is a front view of the noncontact power-transmission coil 21WS formed by sticking a planar coil to a flexible printed-circuit board 30. FIG. 3 is a front view of the flexible printed-circuit board 30 without the attachment of the planar coil. FIG. 4 is a schematic cross sectional view of the noncontact power-transmission coil 21WS.

As shown in FIGS. 2 to 4, the noncontact power-transmission coil 21WS includes a planar coil. In this case, the planar coil is formed of a single or twisted wire 40 having a surface provided with an insulating layer. In addition, the wire is spirally wound in a substantially same plane. One flat surface of the planar coil is stuck on the surface of the flexible printed-circuit board 30 through an adhesion sheet 42.

In addition, a magnetic sheet 43 is stuck on the other flat surface of the planar coil so that the magnetic sheet 43 can entirely cover the other flat surface of the planar coil through an adhesion sheet 41. The magnetic sheet 43 is provided for efficiently forming a magnetic path of the planar coil to cause an increase in inter-linkage magnetic flux between the primary transmission coil 5 and the secondary-transmission circuit 11, while preventing undesired radiation with the magnetic field generated from each of the coils. A metal sheet (not shown), such as one made of aluminum, may be stuck on the outer surface of the magnetic sheet if required.

The flexible printed-circuit board 30 is a substrate in the shape of a thin layer, for example, one using a polyimide resin as a base material. A surface-insulating layer is formed on the flexible printed-circuit board 30, except of a first coil contact portion 36, a second coil contact portion 35, a first external connection terminal 31, and a second external connection terminal 32. Here, the first coil contact portion 36 is formed on the flexible printed-circuit board 30 so that it can be arranged in an inner peripheral portion 37 of the planar coil when the planar coil is stuck on the flexible printed-circuit board 30. The second coil contact portion 35 is arranged in the vicinity of the outside of a planar coil external peripheral portion 38.

Furthermore, the first coil contact portion 36 and the first external connection terminal portion 31 are electrically connected to each other through a first internal conductor pattern 33 formed under the surface-insulating layer. Similarly, the second coil contact portion 35 and the second external terminal portion 32 are electrically connected to each other through a second internal conductor pattern 34 formed under the surface insulating layer.

Furthermore, when the flexible printed-circuit board 30 is stuck on the planar coil, the first coil contact portion 36 is electrically connected to one end of the electric wire in the inner peripheral portion 37 of the planar coil at the start of the winding. In addition, the second coil contact portion 35 is electrically connected to the other end of the electric wire in the outer peripheral portion 38 of the planar coil at the end of the winding.

As the noncontact power-transmission coil 21WS is formed as described above, overlapped portions of the electric wire can be avoided. Thus, the thickness of the noncontact power-transmission coil 21WS can be extremely reduced.

[Another Configuration of Noncontact Power-Transmission Coil]

As shown in FIGS. 5 to 8, the noncontact power-transmission coil, which is provided as each of the above primary transmission coil 5 and the above secondary-transmission circuit 11, may be a multi-layered noncontact power-transmission coil 21PS formed by stacking a plurality of flexible-printed circuit boards provided with planar coil patterns.

Figure 5:
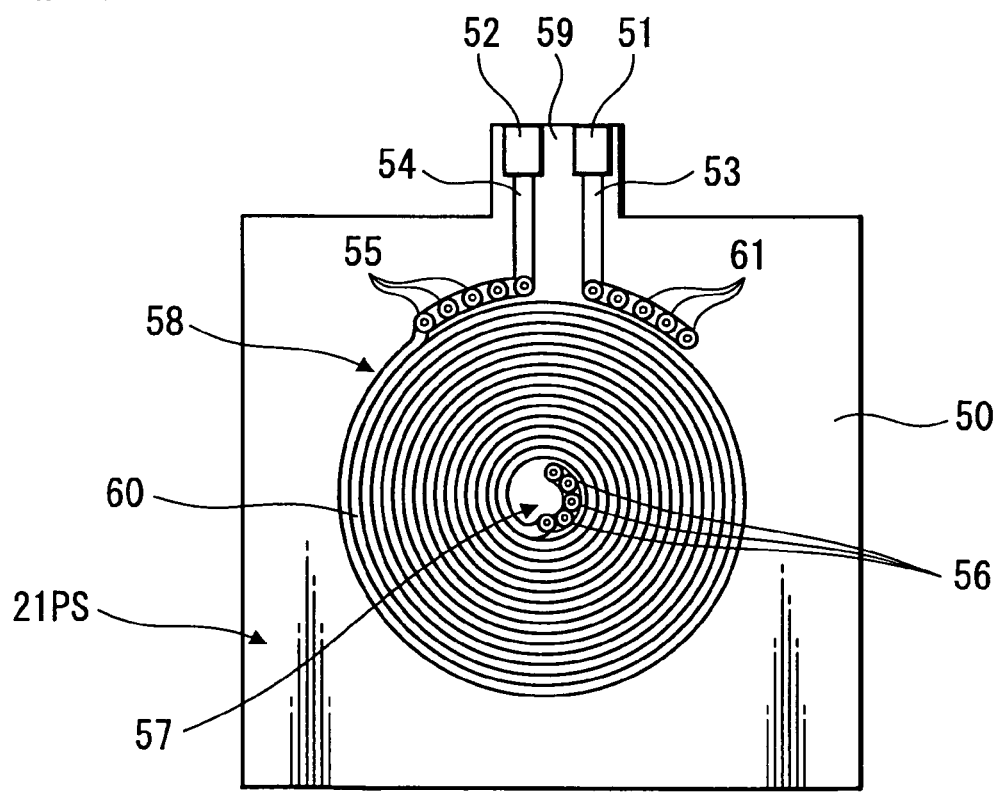
FIG. 5 is a schematic front view of a noncontact power-transmission coil provided with a multi-layered flexible printed-circuit board in which planar coil patterns made of the respective spirally-wound conductor patterns are formed.
Figure 6:
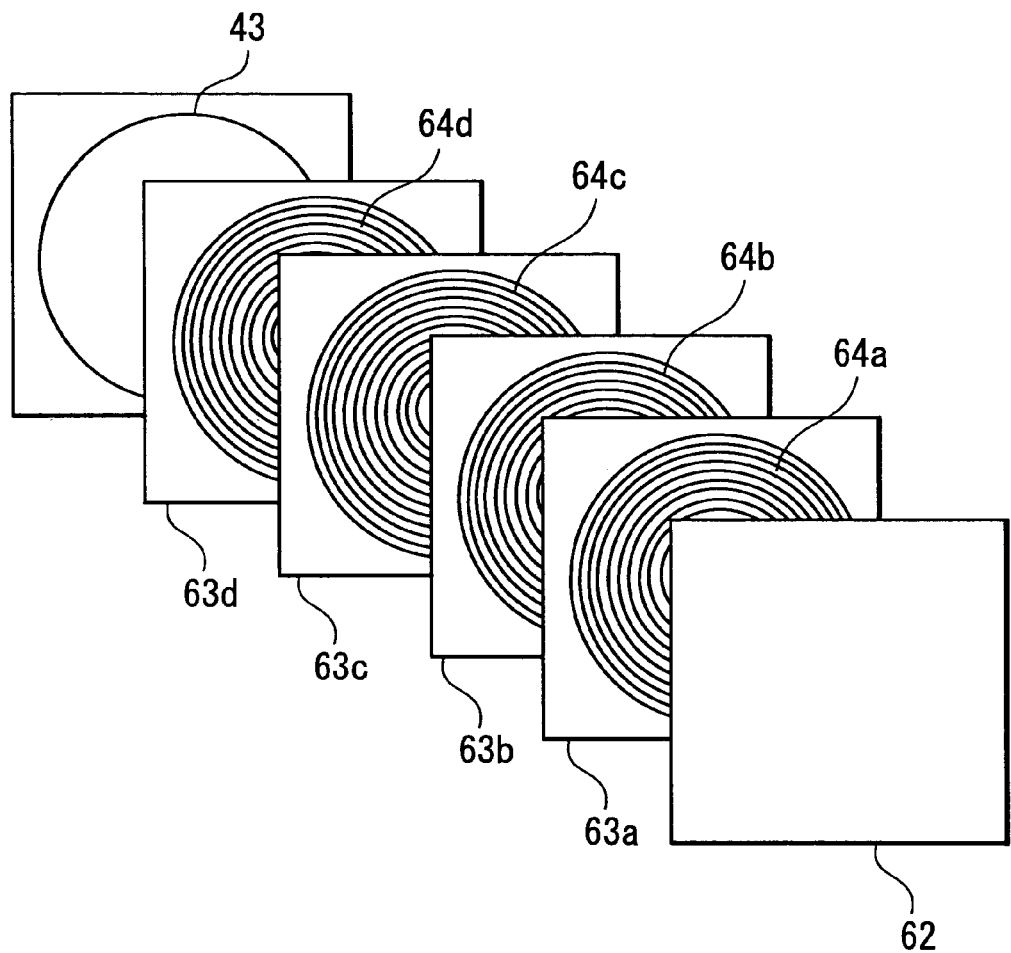
FIG. 6 is a schematic perspective view of the multi-layered flexible printed-circuit board shown in FIG. 5, where layers are separated from each other.
Figure 7:
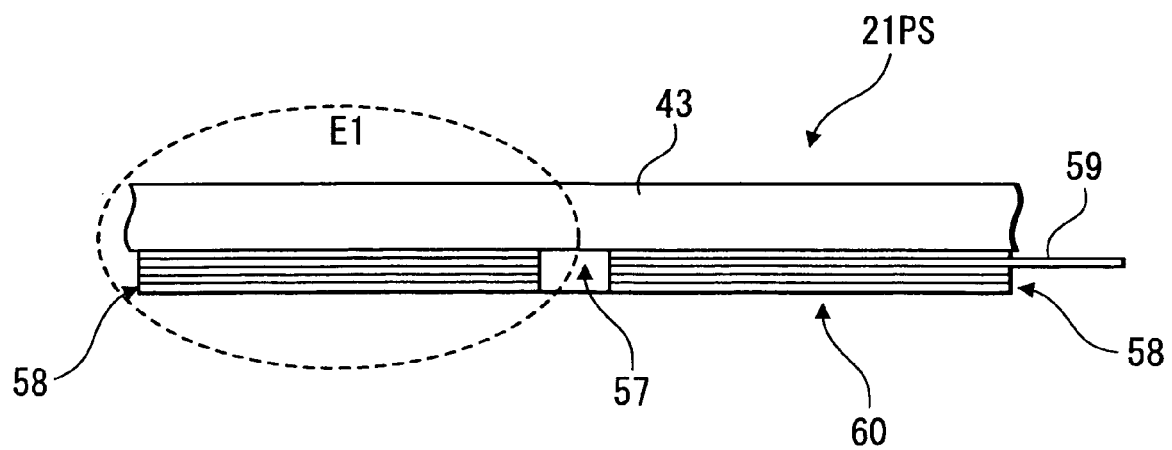
FIG. 7 is a schematic cross-sectional view of the noncontact power-transmission coil made of the multi-layered flexible printed-circuit board shown in FIG. 5.
Figure 8:
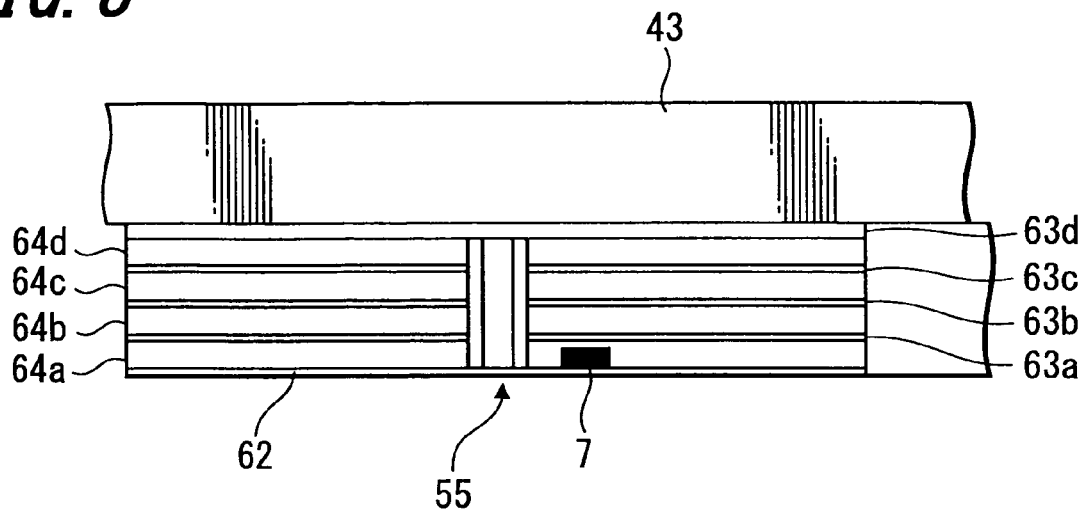
FIG. 8 is a partly-enlarged view of the noncontact power-transmission coil made of the multi-layered flexible printed-circuit board shown in FIG. 7.
Figure 9:
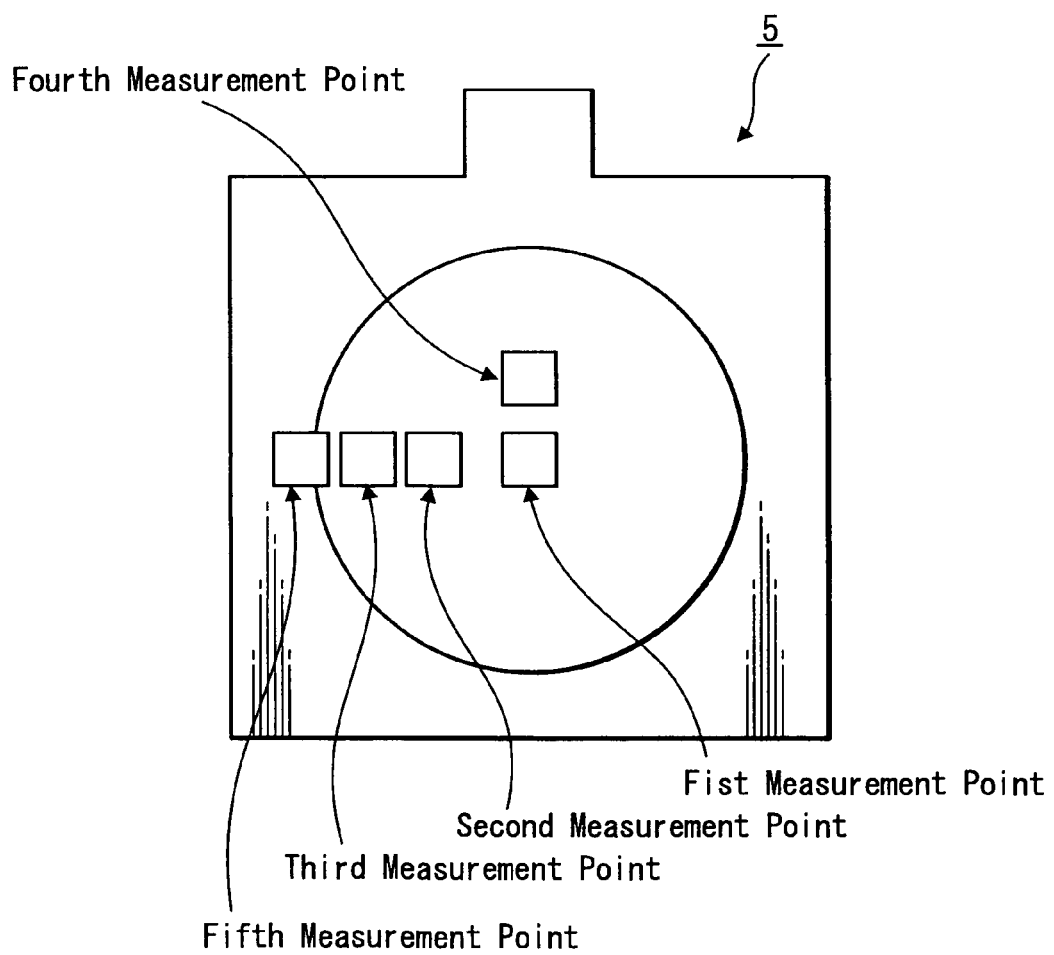
FIG. 9 is a schematic diagram illustrating measurement points on the primary transmission coil to determine an increase in temperature of each of foreign metal substances made of different materials.

FIG. 5 is a front view of the noncontact power-transmission coil 21PS having a multi-layered flexible printed-circuit board. FIG. 6 is a schematic perspective view of the noncontact power-transmission coil 21PS in which the respective layers are illustrated in separation from one another. FIG. 7 is a schematic cross sectional view of the noncontact power-transmission coil 21PS having a multi-layered flexible printed-circuit board. FIG. 8 is an enlarged view of the portion enclosed with an ellipse E1 shown in FIG. 7.

As shown in FIGS. 5 to 8, the noncontact power-transmission coil 21PS includes, for example, a four-layered structure. Each of a first-layer substrate 64*a*, a second-layer substrate 64*b*, a third-layer substrate 64*c*, and a fourth-layer substrate 64*d* may be made of polyimide resin or the like and formed with spirally-wound linear conductor patterns 60 formed on the respective sheet-shaped substrates.

A surface insulating layer 62 is formed on the surface of the top layer, the first layer substrate 64*a*, and an adhesion layer and an interlayer insulating layer 63*a* are formed between the first layer substrate 64*a* and the second layer substrate 64*b*. Similarly, an adhesion layer and an interlayer insulating layer 63*b* are formed between the second layer substrate 64*b* and the third layer substrate 64*c*. In addition, an adhesion layer and an interlayer insulating layer 63*c* are formed between the third layer substrate 64*c* and the fourth layer substrate 64*d*. A magnetic sheet 43 is stuck on the back side of the bottom layer, the fourth layer substrate 64*d*, through the adhesion layer and the insulating layer 63*d*.

Furthermore, the ends of the respective conductive patterns 60 of the first to fourth layer substrates 64*a* to 64*d*, which are located at an inner peripheral portion 57, are electrically connected to one another through first through-holes 56. Similarly, the ends of the respective conductive patterns 60 of the first to fourth layer substrates 64*a* to 64*d*, which are located at an outer peripheral portion 58, are electrically connected to one another through second through-holes 55.

Furthermore, the first through-holes 56 for the conductor patterns 60 of the respective layers, which are located at the inner peripheral portion 57, are electrically connected to the through-holes 61 for the conductor patterns of the respective layers, which are located at the outer peripheral portion 58. Although not shown in the figure, a metal sheet, such as one made of aluminum, may be stuck on the outer side of the magnetic sheet 43 if required.

Furthermore, for example, the second through-hole 55 of the fourth layer substrate 64*d* is electrically connected to a second external connection terminal portion 52 through a second inner conductor pattern 54. Similarly, the first through-hole 56 of the fourth layer substrate 64*d* is electrically connected to a first external connection terminal portion 51 through the above through-hole 61 and a first inner conductor pattern 53.

In the noncontact power transmission coil 21PS formed as described above, the planar coil is formed with the conductor pattern 60 of the flexible printed-circuit board. Thus, such a noncontact power-transmission coil 21PS can be thinner than the noncontact power-transmission coil 21WS having the planar coil made of the electric wire as described above.

[Temperature-Detecting Element]

Next, the cradle 1 in accordance with the present embodiment uses either the above noncontact power transmission coil 21WS or the noncontact power transmission coil 21PS and an electromagnetic induction is then applied to carry out a power transmission from the cradle 1 to the mobile phone unit 2. In this case, an eddy current may be caused in a foreign metal substance, such as a coin, when the foreign metal substance is placed on the above cradle 1. Thus, the foreign metal substance may be abnormally heated.

Therefore, either the noncontact power-transmission coil 21WS or the noncontact power-transmission coil 21PS, which is the primary transmission coil 5 on the cradle 1, is provided with a temperature-detecting element 7. The control circuit 9 of the cradle 1 is designed to terminate the charging under control when the temperature detected by the temperature-detecting element 7 exceeds a predetermined temperature.

Specifically, the noncontact power-transmission coil 21WS having the planar coil made of the above wound electric wire 40 is used as the primary transmission coil 5. In this case, as shown in FIG. 3 and FIG. 4, the temperature-detecting element 7 is directly formed as a temperature-detecting element layer in the conductor pattern of the flexible printed-circuit board 30.

Furthermore, as shown in FIG. 3, both a third external connection terminal portion 81 and a fourth external connection terminal portion 82 are formed on the flexible printed-circuit board 30. These portions 81, 82 are responsible for receiving temperature-detecting signals output to the outside from the above temperature-detecting element 7. In addition, wiring patters are formed between the third and fourth external connection terminal portions 81, 82 and the temperature-detecting element 7, respectively.

Alternatively, the primary transmission coil 5 used may be the noncontact power-transmission coil 21PS of the multi-layered flexible printed-circuit board having the planer coil made of the conductor pattern 60 as described above. In this case, the temperature-detecting element 7 may be directly formed as a temperature-detecting element layer in the conductor pattern of, for example, the first layer substrate 64a of the multi-layered flexible printed-circuit board as shown in FIG. 8. In this case, furthermore, wiring patterns (not shown) for the transmission of temperature-detecting signals from the temperature-detecting element 7 (temperature-detecting element layer) are connected to the third external connection terminal portion 81 and the fourth external connection terminal portion 82 through a through-hole and so on as is the above case shown in FIG. 3.

As described above, the direct formation of the temperature-detecting element 7 as a temperature-detecting element layer in the conductor pattern of the flexible printed-circuit board can prevent the noncontact power-transmission coil from causing a disadvantage of increased thickness. In this example, the cradle 1 is provided with only one temperature-detecting element 7 as described above. However, the cradle 1 may be provided with a plurality of temperature-detecting elements 7. Even if two or more temperature-detecting elements 7 are mounted, there is no increase in the thickness of the noncontact power-transmission coil because the temperature-detecting elements 7 are directly formed in the conductor patterns of the respective flexible printed-circuit boards.

[Setting Position of Temperature-Detecting Element]

Here, as described above, the temperature-detecting element 7 is directly formed as a temperature-detecting element layer in the conductor pattern of the flexible printed-circuit board. However, an increase in temperature of a foreign metal substance, such as a coin, due to the placement of the foreign metal substance on the cradle 1, largely relates to the size of the foreign metal substance and the position at which the foreign metal substance is mounted. In other words, there is a case that a foreign metal substance has a predetermined size or less or the foreign metal substance is placed at a predetermined distance or more from the primary transmission coil 5. In this case, the increase in the temperature of the foreign material is small and the above problem of an abnormal increase in temperature may not occur. Thus, the setting position of the temperature-detecting element 7 for detecting the temperature of the primary transmission coil 5 is important. Therefore, the applicants of the present invention mount the temperature-detecting element 7 on the optimal position determined by studying: a material of the foreign metal substance, the size thereof, the location thereof mounted on the cradle 1, and the increase in temperature with respect to the respective positions on the cradle 1.

[Difference in Increase in Temperature Due to Material of Foreign Metal Substance]

The applicants have measured an increase in temperature of a foreign metal substance after placing the foreign metal substance on a predetermined position on the primary transmission coil 5. Here, such a position corresponds to the central portion (are where a hollow is present and magnetic flux is concentrated) of the primary transmission coil 5. Here, the foreign metal substance may be any of materials, such as a 100-yen coin, a 10-yen coin, a 1-yen coin, the edge of a utility knife, a clip, a solder alloy, a white metal material, a phosphor bronze material, and a stainless material.

As a result, among the above materials of the foreign metal substance, materials, such as a white metal material, a phosphor bronze material, and a stainless material showed measurement results in which the temperatures of the materials may increase to an abnormal temperature within a short time. This is because these materials tend to allow the passage of a current when applied with magnetic force and show large resistances.

[Difference in Increase of Temperature Due to Material of Foreign Metal Substance and Setting Position]

The applicants have placed foreign metal substances made of different materials on the respective measurement points and then measured the increase in temperature of each foreign metal substance. Specifically, the foreign metal substances used are "100-yen coins" and "phosphor bronze materials". Each of these foreign metal substances is placed on a first to fifth measurement points on the primary transmission coil 5 and the increase in temperature was then measured.

Figure 10:
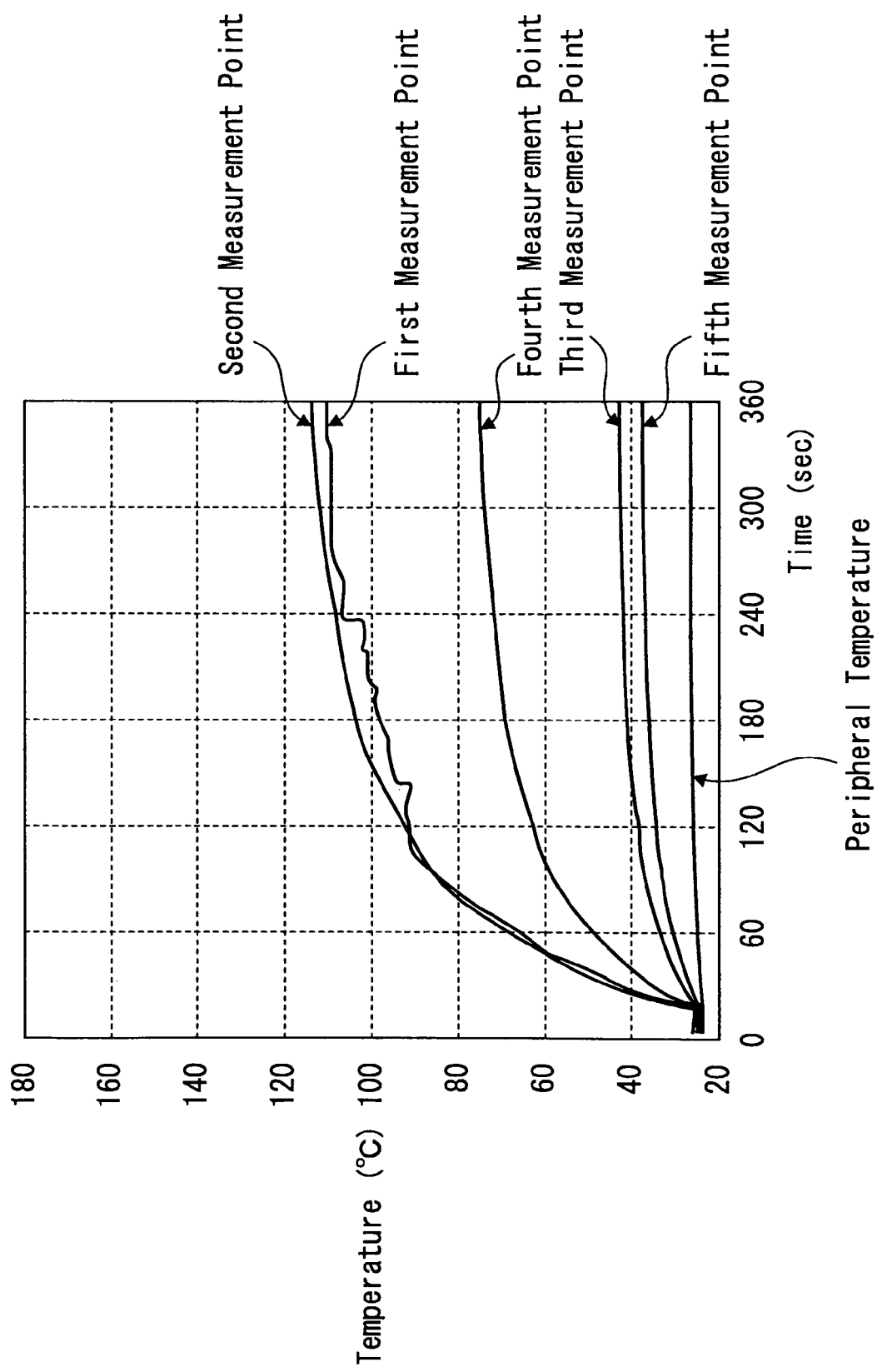
FIG. 10 is a graphical representation of an increase in temperature of a 100-yen coin at each measurement point shown in FIG. 9.

FIG. 10 is a graphical representation of the increase in temperature at each measurement point when a "100-yen coin" is used as a foreign metal substance. As shown in FIG. 10, when a "100-yen coin" is used as the foreign metal substance, the measurement results show that the more the setting position of the "100-yen coin" comes close to the central portion of the primary transmission coil 5, the more the increase in the temperature is large.

Figure 11:
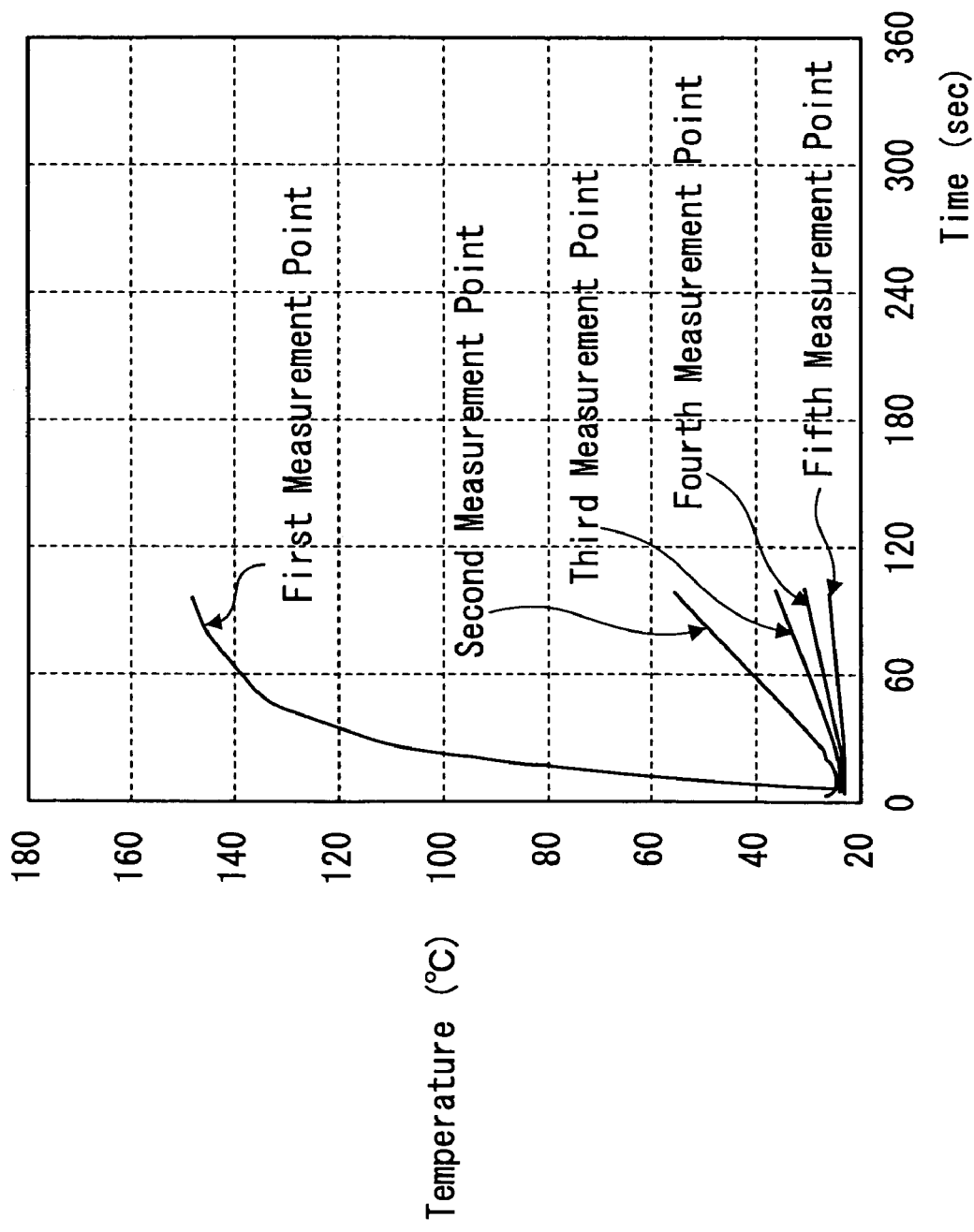
FIG. 11 is a graphical representation of an increase in temperature of a phosphor bronze material at each measurement point shown in FIG. 9.

Further, FIG. 11 is a graphical representation of the increase in temperature at each measurement point when a "phosphor bronze material" (10 mm in side length, 1 mm in thickness, and 10 $mm^2$ in area of a regular tetragon) is used as the foreign metal substance. As shown in FIG. 11, the results of the measurement show the follows. When a "phosphor bronze material" is used as a foreign metal substance, the increase in the temperature is large in the case of the "phosphor bronze material" being mounted on the central portion of the primary transmission coil 5. If the setting position of the "phosphor bronze material" is apart from the central portion of the primary transmission coil 5 even if only slightly, the increase in temperature may is not so large.

[Difference in Increase in Temperature with Size (Area) of Foreign Metal Substance]

Next, the applicants have placed each of foreign metal substances having different sizes (areas) on the central portion of the primary transmission coil and measured the increase in temperature with respect to these materials. FIG. 12A is a table representing the relationship between the areas of the respective foreign metal substances made of "phosphor bronze" and the different durations of current application to the primary transmission coil 5. In the case of the measurement illustrated in FIG. 12A, a phosphor bronze material (3 mm in side length, 1 mm in thickness, and 9 mm$^2$ in area of a regular tetragon) was mounted on the central portion on the primary transmission coil 5. The primary transmission coil 5 was then sequentially applied with current for 30 seconds, 60 seconds, 90 seconds, 120 seconds, and 180 seconds in this order. Consequently, as shown in FIG. 12A, the results of the measurement indicated that the temperature of the phosphor bronze material increased from 30° C. (initial temperature) to a series of 36.4° C. (current application for 30 sec.), 39° C. (current application for 60 sec.), 40.5° C. (current application for 90 sec.), 42.2° C. (current application for 120 sec.), and 43.9° C. (current application for 180 sec.) in this order.

Similarly, a phosphor bronze material (12 mm in side length, 1 mm in thickness, and 141 mm$^2$ in area of a regular tetragon) was mounted on the central portion on the primary transmission coil 5. The primary transmission coil 5 was then sequentially applied with current for 30 seconds, 60 seconds, 90 seconds, 120 seconds, and 180 seconds in this order. Consequently, the results of the measurement indicated that the temperature of the phosphor bronze material increased from 30° C. (initial temperature) to a series of 113.2° C. (current application for 30 sec.), 127.7° C. (current application for 60 sec.), 130.2° C. (current application for 90 sec.), 128.4° C. (current application for 120 sec.), and 143.1° C. (current application for 180 sec.) in this order.

FIG. 12B is a graphical representation of the increase in the temperature when the above "phosphor bronze material" with an area of "3 mm$^2$", "5 mm$^2$", "6 mm$^2$", "7 mm$^2$", "8 mm$^2$", "10 mm$^2$", or "12 mm$^2$" was placed on the central portion of the primary transmission coil 5. As shown in the results of the measurement illustrated in the graph, the more the area of the "phosphor bronze material" mounted on the primary transmission coil 5 increases, the larger the increase of the temperature becomes.

FIG. 12C is a graphical representation of the relationship between the area of the above "phosphor bronze material" and the increase in the temperature. As shown in the graph, the more the area of the "phosphor bronze material" mounted on the primary transmission coil 5 increases, the larger the increase of the temperature becomes.

Here, when the dangerous temperature of a foreign metal substance is defined as 75° C. or more, as shown in FIG. 12A, the results of the measurement shows that the foreign metal substance reaches the above "dangerous temperature" when the area of the foreign metal substance is "7 mm$^2$" or more. In contrast, the results of the measurement show that the possibility of allowing the foreign metal substance to reach the above dangerous temperature is extremely low when the area of the foreign metal substance is smaller than "7 mm$^2$".

[Relationship Between Temperature of Foreign Metal Substance at Every Setting Position of Foreign Metal Substance with Each Area]

Figures 13A, 13B:
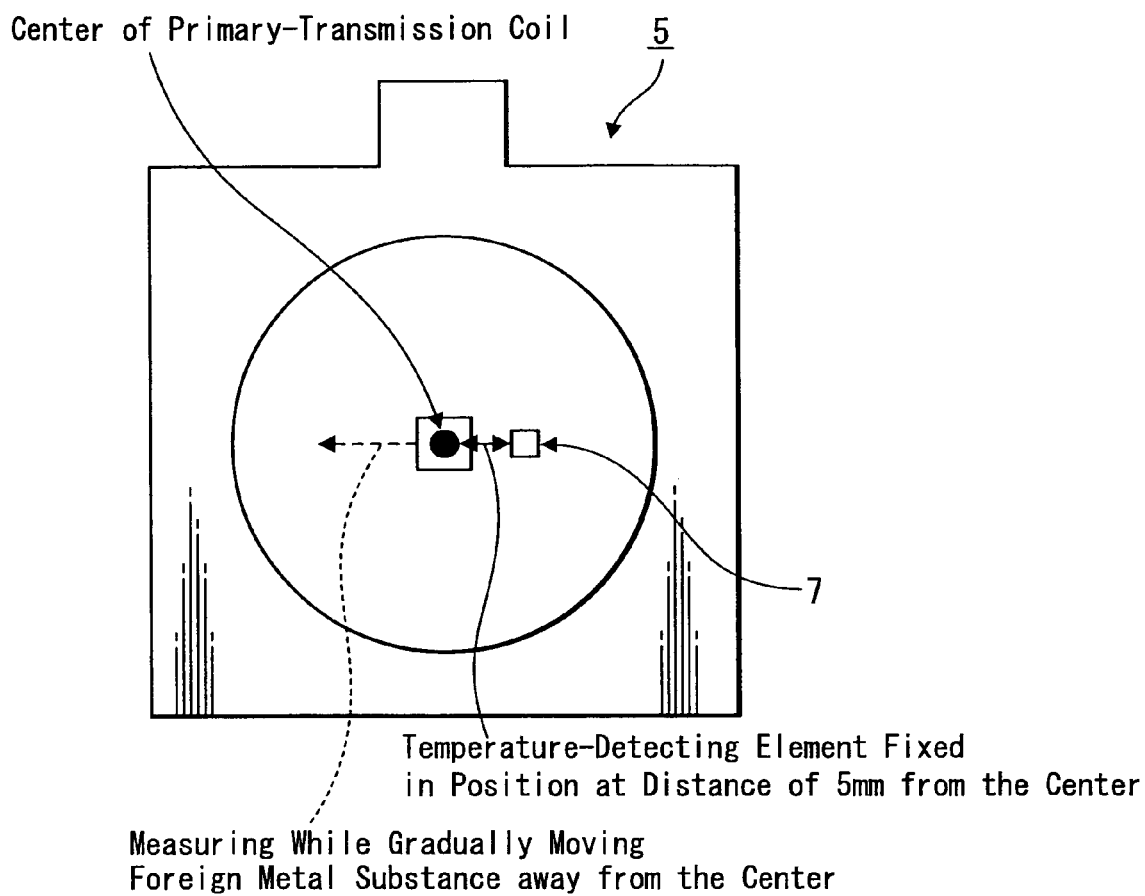
FIGS. 13A and 13B are diagrams for illustrating the relationship between the position of a foreign metal substance mounted on the cradle 1, where

Next, as shown in FIG. 13A, the applicants have fixed the setting position of the temperature-detecting element 7 on a position at a distance of 5 mm from the central portion of the primary transmission coil 5. Subsequently, foreign metal substances having different areas are gradually moving away from the central portion of the primary transmission coil 5. Simultaneously, the temperature-detecting element 7 detects the saturated temperatures of the respective foreign metal substances and the temperatures of the respective foreign metal substance at every setting position.

FIG. 13B is a table that represents the saturated temperatures of the above respective phosphor bronze materials and the temperatures detected by the temperature-detecting element 7. One of the "phosphor bronze material" used is in the form of a regular tetragon with a side length of 10 mm, a thickness of 1 mm, and an area of 100 mm$^2$ and the other thereof is one with a side length of 25 mm, a thickness of 1 mm, and an area of 625 mm$^2$.

As shown in FIG. 13B, the phosphor bronze material with an area of 100 mm$^2$ is placed on each of the positions at a distance of 2 mm, 4 mm, 6 mm, 8 mm, and 10 mm from the central portion of the primary transmission coil 5 in this order. Subsequently, the saturated temperature of the phosphor bronze material and the temperature actually detected by the temperature-detecting portion 7 are measured at every position. As a result, the saturated temperatures of the phosphor bronze material at the respective positions as described above are 148° C., 112° C., 58° C., 52° C., and 48° C. in this order. In addition, the temperatures detected by the temperature-detecting element 7 at the respective positions are 121° C., 98° C., 48° C., and 42° C. in this order.

Similarly, the phosphor bronze material of 625 mm$^2$ in area is placed on each of the positions at a distance of 2 mm, 4 mm, 6 mm, 8 mm, and 10 mm from the central portion of the primary transmission coil 5 in this order. Subsequently, the saturated temperature of the phosphor bronze material and the temperature actually detected by the temperature-detecting portion 7 are measured at every position. As a result, the saturated temperatures of the phosphor bronze material at the respective positions as described above are 153° C., 139° C., 117° C., 76° C., and 53° C. in this order. In addition, the temperatures detected by the temperature-detecting element 7 at the respective positions are 125° C., 118° C., 104° C., 51° C., and 41° C. in this order.

[Relationship Between Temperature of Foreign Metal Substance of Each Area and Temperature Detected by Temperature-Detection Element]

Next, the applicants have fixed the setting position of the foreign metal substance on the central portion of the primary transmission coil 5. Subsequently, the setting position of the temperature-detecting element 7 is gradually moving away from the central portion of the primary transmission coil 5. Simultaneously, the temperature-detecting element 7 detects the saturated temperatures of the respective foreign metal substances and the temperatures of the respective setting positions.

FIG. 14B is a table that represents the saturated temperatures of the above respective phosphor bronze materials and the temperatures detected by the temperature-detecting element 7. As shown in FIG. 14B, a "phosphor bronze material" in the form of a regular tetragon with a side length of 7 mm, a thickness of 1 mm in thickness, and an area of 49 mm$^2$ was mounted on the central portion on the primary transmission coil 5. The setting position of the temperature-detecting element 7 is shifted to the respective positions at distances of 2 mm, 4 mm, 6 mm, 8 mm, and 10 mm in this order from the central portion of the primary transmission coil 5. As a result, when the saturated temperature of the phosphor bronze material and the temperature actually detected by the temperature-detecting element 7 at each position are measured, the saturated temperature of the above phosphor bronze material is 85.2° C. and the temperatures detected by the temperature-detecting element 7 at the respective positions are 76° C., 73° C., 71° C., 60° C., and 50° C. in this order.

Similarly, a "phosphor bronze material" in the form of a regular tetragon with a side length of 10 mm, a thickness of 1 mm in thickness, and an area of 100 mm$^2$ was mounted on the central portion on the primary transmission coil 5. The setting position of the temperature-detecting element 7 is shifted to the respective positions at distances of 2 mm, 4 mm, 6 mm, 8 mm, and 10 mm in this order from the central portion of the primary transmission coil 5. As a result, when the saturated temperature of the phosphor bronze material and the temperature actually detected by the temperature-detecting element 7 at each position are measured, the saturated temperature of the above phosphor bronze material is 112.4° C. and the temperatures detected by the temperature-detecting element 7 at the respective positions are 98° C., 93° C., 93° C., 62° C., and 50° C. in this order.

Similarly, a "phosphor bronze material" in the form of a regular tetragon with a side length of 15 mm, a thickness of 1 mm in thickness, and an area of 225 mm$^2$ was mounted on the central portion on the primary transmission coil 5. The setting position of the temperature-detecting element 7 is shifted to the respective positions at distances of 2 mm, 4 mm, 6 mm, 8 mm, and 10 mm in this order from the central portion of the primary transmission coil 5. As a result, when the saturated temperature of the phosphor bronze material and the temperature actually detected by the temperature-detecting element 7 at each position are measured, the saturated temperature of the above phosphor bronze material is 143.1° C. and the temperatures detected by the temperature-detecting element 7 at the respective positions are 131° C., 129° C., 116° C., 98° C., and 61° C. in this order.

Similarly, a "phosphor bronze material" in the form of a regular tetragon with a side length of 25 mm, a thickness of 1 mm in thickness, and an area of 625 mm$^2$ was mounted on the central portion on the primary transmission coil 5. The setting position of the temperature-detecting element 7 is shifted to the respective positions at distances of 2 mm, 4 mm, 6 mm, 8 mm, and 10 mm in this order from the central portion of the primary transmission coil 5. As a result, when the saturated temperature of the phosphor bronze material and the temperature actually detected by the temperature-detecting element 7 at each position are measured, the saturated temperature of the above phosphor bronze material is 153.1° C. and the temperatures detected by the temperature-detecting element 7 at the respective positions are 129° C., 134° C., 128° C., 98° C., and 89° C. in this order.

The central portion of the primary transmission coil 5 is a portion where magnetic force lines are concentrated. Therefore, when the central portion of the primary transmission coil 5 is provided with the temperature-detecting element 7, the temperature-detecting element 7 itself will be heated. As a result, it may become difficult to detect the temperature of the foreign metal substance correctly. For this reason, it is preferable to place the temperature-detecting element 7 at a position distant from the central portion of the primary transmission coil 5. From the results of the measurement, it is found that the temperature-detecting element 7 may be preferably located at a position distant from the central portion of the primary transmission coil 5. In other words, the temperature-detecting element 7 may be mounted at a distance of 4 mm to 6 mm from the central portion of the primary transmission coil 5.

[Relationship Between Temperature of Foreign Metal Substance and Temperature Detected by Temperature-Detecting Element]

Next, the temperature-detecting element 7 formed in the primary transmission coil 5 may not directly detect the temperature of the foreign metal substance. The temperature-detecting element 7 detects the amount of heat transmitted to the primary transmission coil 5 from a heat-generating foreign metal substance. In other words, the temperature-detecting element 7 detects the temperature of the foreign metal substance indirectly through the primary transmission coil 5. Therefore, as shown in FIG. 14B, the temperature detected by the temperature-detecting element 7 is lower than the actual temperature of the foreign metal substance.

Figure 15A:
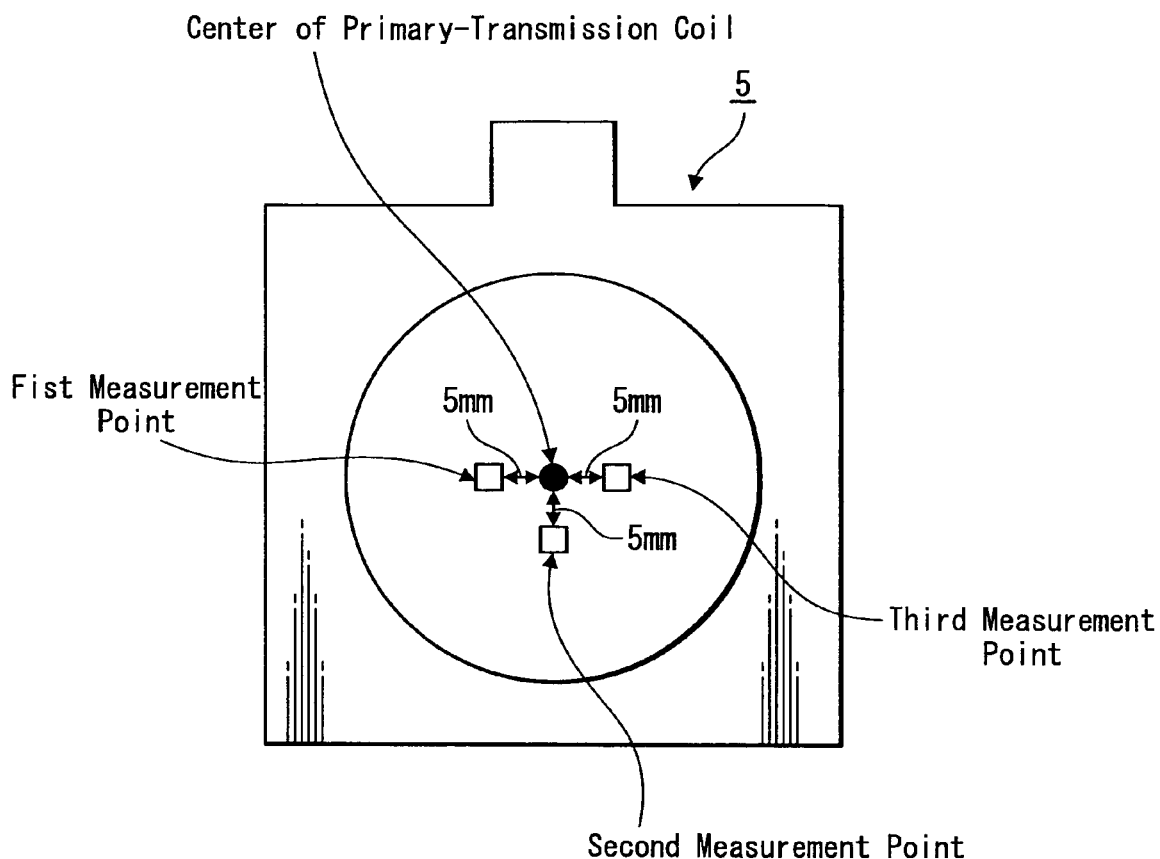
FIGS. 15A and 15B are diagrams for illustrating the relationship between the actual temperature of the foreign metal substance mounted on the cradle 1 and the temperature detected by the temperature-detecting element, where

The present applicants have measured the difference between the actual temperature of a foreign metal substance and the temperature thereof detected by the temperature-detecting element 7. In this case, as shown in FIG. 15A, the temperature-detecting element 7 is placed on each of first to third measurement points at a distance of 5 mm from the central portion of the primary transmission coil 5. In addition, the foreign metal substance is placed on the central portion of the primary transmission coil 5. The temperature of the foreign metal substance and the temperature detected by the temperature-detecting element 7 are then measured.

Figure 15B:
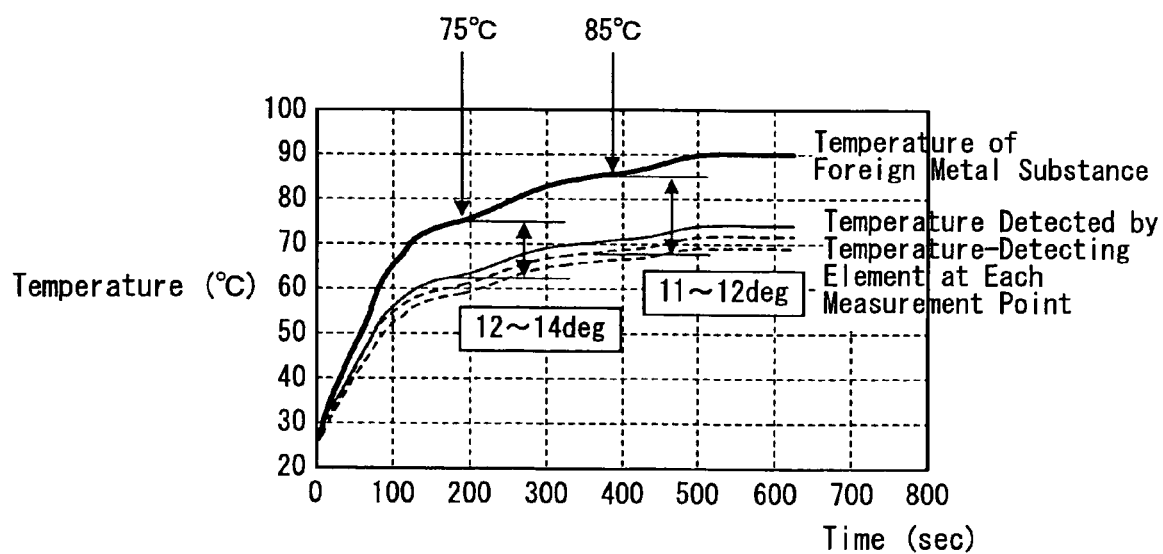

FIG. 15B is a graphical representation of the temperature of a stainless steel plate of 25 mm in side length and the temperature detected by the temperature-detecting element 7. Here, the stainless steel plate is placed on the central portion of the primary transmission coil 5. As shown in FIG. 15B, when the stainless steel plate reaches a dangerous temperature of 75° C. as described above, the temperature-detecting element 7 detects a temperature of about 60° C. In this case, there is a difference of about 12° C. to 14° C. between the dangerous temperature of the stainless steel and the temperature detected by the temperature-detecting element 7. When the stainless steel reaches 85° C., the temperature-detecting element 7 detects a temperature of about 73° C. at each measurement point as described above. In this case, the difference observed is about 11° C. to 12° C.

Therefore, there is a difference of about 11° C. to 14° C. between the temperature of the stainless steel and the temperature detected by the temperature-detecting element 7. In other words, it is found that the foreign metal substance reaches a dangerous temperature of 75° C. when the temperature-detecting element 7 detects a temperature of about 60° C. Accordingly, there is found that a need of terminating the supply of power (i.e., terminating the charging) to the primary transmission coil 5 upon detecting a temperature of 60° C. by the temperature-detecting element 7.

[Findings Obtained from Respective Measurement Results and Setting Position of Temperature-Detecting Element]

From the respective results of the above measurements, the applicants have found the following facts:

1. If a foreign metal substance has an area of less than 7 mm$^2$, the amount of heat generated from the foreign metal substance is small and a possibility of reaching a dangerous temperature (75° C.) or more as described above is low. If the foreign metal substance has an area of 7 mm$^2$ or more, the foreign metal substance may reach the dangerous temperature.

2. The more the setting position of the foreign metal substance is displaced from the central portion of the primary transmission coil 5, the more the amount of heat decreases.

Therefore, the temperature-detecting element 7 may be placed at a position where the temperature of the foreign metal substance placed at a position in proximity to the central portion of the primary transmission coil 5 can be detected. In this case, however, the central portion of the primary transmission coil 5 is a portion where magnetic force lines are concentrated. Therefore, when the central portion of the primary transmission coil 5 is provided with the temperature-detecting element 7, the temperature-detecting element 7 itself will be heated. Thus, it may become difficult to detect the temperature of the foreign metal substance correctly. Therefore, it is preferable to place the temperature-detecting element 7 at a position distant from the central portion of the primary transmission coil 5.

3. The temperature-detecting element 7 detects about 60° C. to 73° C. when a foreign metal substance reaches a dangerous temperature of 75° C. In other words, it is found that there is a need of terminating the supply of power (i.e., terminating the charging) to the primary transmission coil 5 upon detecting a temperature of 60° C. by the temperature-detecting element 7.

Figure 16A:
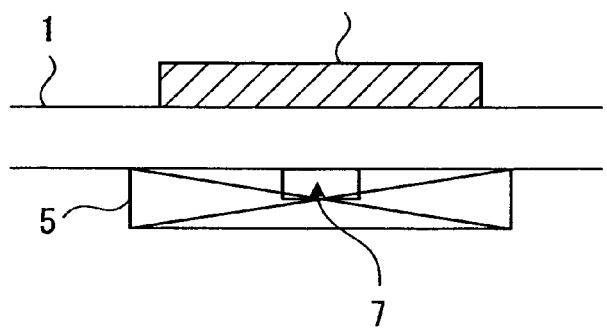
FIGS. 16A to 16C are diagrams for illustrating a specific setting position of the temperature-detecting element, where
Figure 16B:
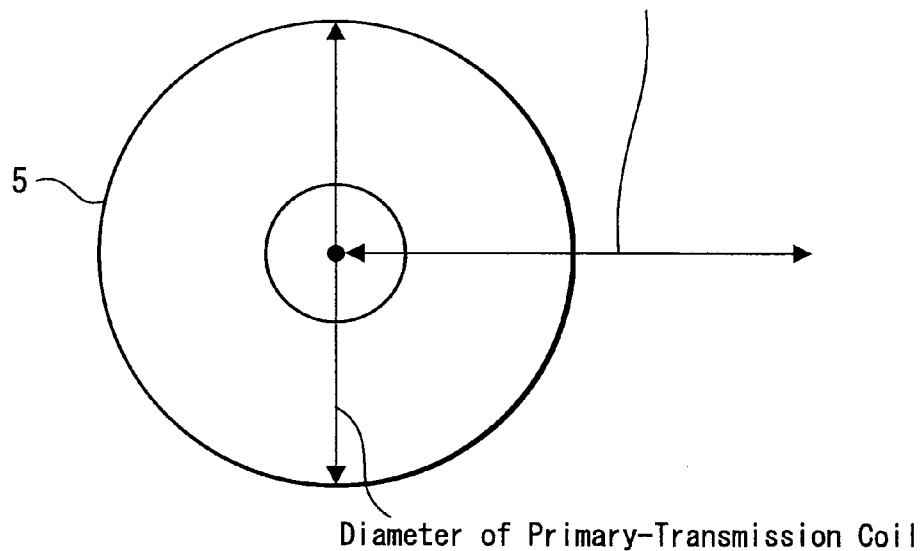

In consideration of these facts, the applicants have found that the temperature-detecting element 7 may be arranged as follows. The temperature-detecting element 7 is mounted on the side of a contact surface between the cradle 1 and the primary transmission coil 5 as shown in FIG. 16A. Simultaneously, the temperature-detecting element 7 is located within the range of not more than the diameter of the primary transmission coil 5 from the center position of the primary transmission coil 5 as shown in FIG. 16B.

Figure 16C:
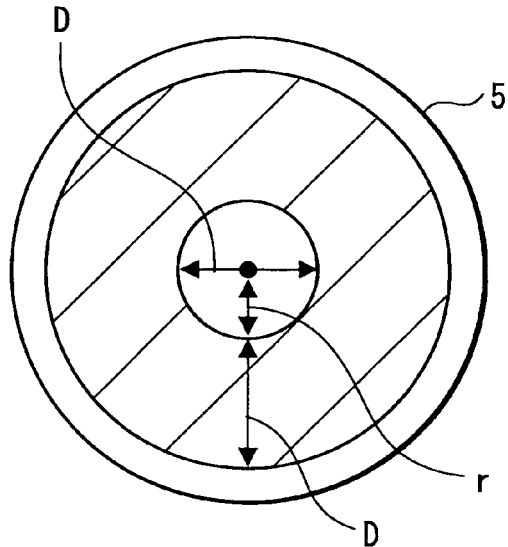

Furthermore, within the above range, it is found that the temperature-detecting element 7 is preferably on the side of a contact surface of cradle 1 between the mounting portion and the primary transmission coil 5. In addition, as indicated by the shaded portion in FIG. 16C, the center of the temperature-detecting element is preferably arranged between a position at a distance corresponding to the inner radius "r" of the primary transmission coil 5 from the center of the primary transmission coil 5 and a position at a distance corresponding to the inner diameter of the primary transmission coil 5.

Based on these findings, as an example, the applicants mount the temperature-detecting element 7 on the side of a contact surface between the cradle 1 and the primary transmission coil 5 such that the center of the temperature-detecting element 7 can be located at a position at a distance of 5 mm from the center of the primary transmission coil 5 in the cradle 1 according to the present embodiment.

Figure 17:
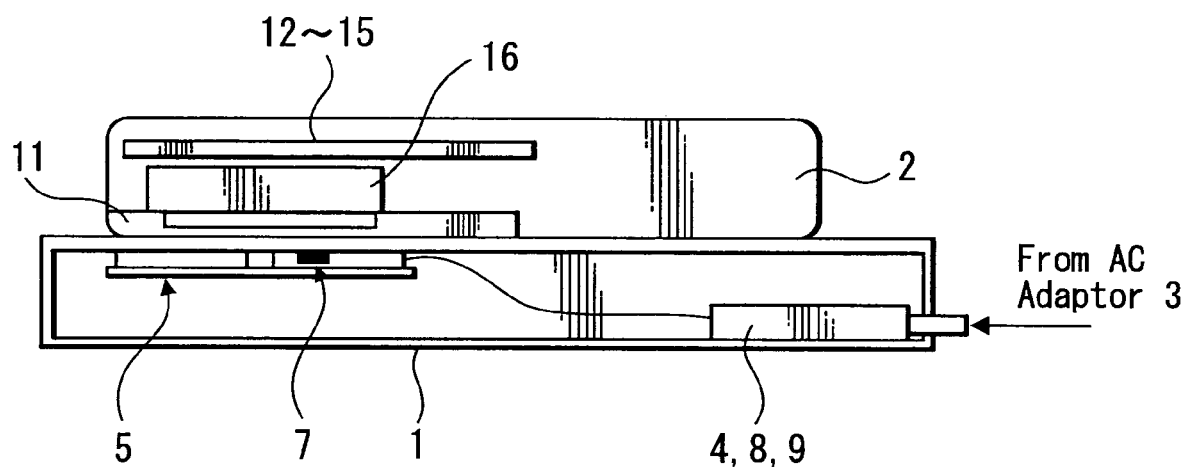
FIG. 17 is a schematic cross-sectional view of both a cradle and a mobile phone unit mounted on the cradle.

Next, the charging operation of the cradle 1 on which the temperature-detecting element 7 is mounted on the aforementioned position will be described. FIG. 17 is a cross sectional view of a cradle 1 on which the mobile phone unit 2 is being mounted at the time of charging.

When the mobile phone unit 2 is mounted on the cradle 1, the primary transmission coil 5 formed in the cradle 1 and the secondary-transmission circuit 11 in the mobile phone unit 2 come close to face each other. As a result, the state of the magnetic field of the primary transmission coil 5 is changed. The control circuit 9 monitors a change in the state of the magnetic field of the primary transmission coil 5 by intermittent drive or the like.

In the mobile phone unit 2, the control circuit 14 of the mobile phone unit 2 determines that the mobile phone unit 2 is mounted on the cradle 1 when a predetermined voltage level is detected. In other words, a voltage level in response to a change in the state of the magnetic field of the secondary power-transmission coil 11 reaches a predetermined voltage level when the mobile phone unit terminal is mounted on the cradle 1.

The control circuit 9 of the cradle 1 and the control circuit 14 of the mobile phone unit 2 exchange their identification information each other through the primary and secondary transmission coils 5, 11 to authenticate each other. Subsequently, the cradle 1 carries out the supply of power to the battery 16 of the mobile phone unit 2 when such an exchange of identification information attains the mutual authentication. Thus, the charging of the battery 2 is initiated.

When the charging is initiated, the control circuit 9 of the cradle 1 coverts a DC power from the AC adaptor 3 into an AC power at a predetermined frequency on the basis of an oscillating frequency signal from the oscillator 2. Subsequently, the AC power is supplied to the primary transmission coil 5 through the driver 6.

In the mobile phone unit, the AC power from the primary transmission coil 5 of the cradle 1 induces an AC power in the secondary-transmission coil 11. The induced AC power is rectified by the rectifying circuit 12 and then converted into a DC power at a predetermined voltage at the LDO 13. Subsequently, the control circuit 14 supplies the DC power from the LDO 13 to the battery 16 through the charging circuit 15. Consequently, the battery 16 can be charged.

[Operations of Detecting Abnormal Temperature and Terminating Charging]

Here, as in the case of the cradle 1, the power transmission to the mobile phone unit 2 may be carried out by electromagnetic induction with both the primary transmission coil 5 and the secondary-transmission circuit 11, which are noncontact power-transmission coils. In this case, for example, an eddy current may be generated in a foreign metal substance, such as a coin, when the foreign metal substance is placed on the cradle 1. As a result, an abnormal overheating of the foreign metal substance is likely to occur.

The temperature-detecting element 7 formed on the cradle 1 indirectly detects the temperature of the mounted material (such as the mobile phone unit 2 or a foreign metal substance) through the primary transmission coil 5 and then transfers the detected output to the temperature-detecting unit 8. The mobile phone unit 2 mounted on the cradle 1 is generally heated to about 40° C. while being charged. In contrast, when the mobile phone unit 2 placed on the cradle 1 causes an abnormal heat generation from any cause or when a foreign metal substance is placed on the cradle 1, the mobile phone unit 2 and the foreign metal substance can be heated to the above dangerous temperature, 75° C. or more.

The temperature-detecting element 7 indirectly detects the temperature of the material mounted on the cradle 1 through the primary transmission coil 5. Thus, when the temperature of the material mounted on the cradle 1 reaches the above dangerous temperature, 75° C., both the temperature-detecting element 7 and temperature-detecting unit 8 detect a temperature of 60° C. When each of the temperature-detecting element 7 and temperature-detecting unit 8 detects the above temperature of 60° C., the control circuit 9 recognizes an increase in temperature of the material mounted on the cradle 1 to the dangerous temperature. Immediately, the control circuit 9 terminates the supply of power to the primary transmission coil 5. As a result, the charging can be interrupted as a termination under control. Consequently, the material mounted on the cradle 1 can be prevented from an abnormal increase in temperature, thereby allowing the cradle 1 to attain the enhanced safety.

Furthermore, the temperature-detecting element 7 is mounted at the optimum position to detect the temperature of the material mounted on the cradle 1, which is determined on the basis of each measurement as described above. Therefore, the temperature of the material mounted on the cradle 1 is detected in real time and then the above charging can be terminated under control with accuracy.

[Another Example of Charge Termination Under Control]

In the above example, the supply of power to the primary transmission coil 5 is terminated under control upon detecting an increase in temperature of the material mounted on the cradle 1 to the dangerous temperature. Alternatively, as described in the followings, the supply of power may be terminated under control in response to the temperature gradient of the above mounted material detected by the temperature-detecting element 7.

Figure 18:
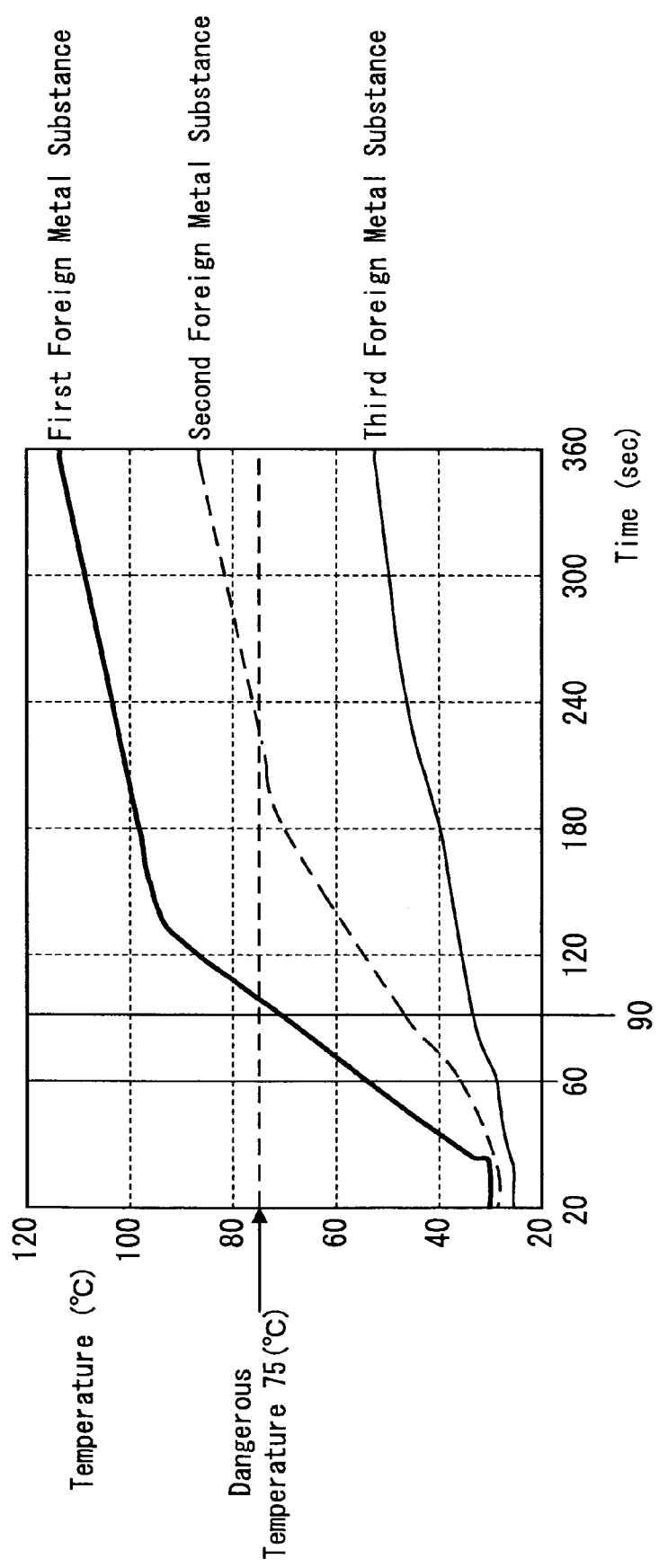
FIG. 18 is a diagram for illustrating the termination of power supply to the primary transmission coil in response to the gradient of an increased temperature of the material mounted on the cradle.

FIG. 18 is a graphical representation of the temperatures of the first to third foreign metal substances mounted on the cradle 1, which vary with the durations of power supply to the primary transmission coil 5. As shown in the graph, the third foreign metal substance does not reach the dangerous temperature even if the duration of power supply to the primary transmission coil 5 is extended. In contrast, the first foreign metal substance reaches the dangerous temperature when the duration of power supply to the primary transmission coil 5 is about 100 seconds. The second foreign metal substance reaches the dangerous temperature when the duration of power supply to the primary transmission coil 5 is about 230 seconds. Furthermore, when comparing the graphical representation of the temperature variations of the first foreign metal substance and the second foreign metal substance with that of the third foreign metal substance, a graph with a high temperature gradient is obtained in the case of the foreign metal substance reaching the dangerous temperature.

In view of these measurement results, for example, the control circuit 9 detects the temperatures detected by the above temperature-detecting element 7 and the above temperature-detecting unit 8 at the time of 60 seconds passed from the initiation of power supply to the primary transmission coil 5. In addition, the control circuit 9 detects the temperatures detected by the above temperature-detecting element 7 and the above temperature-detecting unit 8 at the time of 90 seconds passed from the initiation of power supply to the primary transmission coil 5. Furthermore, on the basis of the detected temperatures at the respective time points, the gradient of temperature increase of a device presently mounted on the cradle 1 is detected. When the gradient is greater than a predetermined level, the power supply to the primary transmission coil 5 is terminated under control.

Consequently, prior to the increase in temperature of the material mounted on the cradle 1 up to the dangerous temperature, the power supply to the primary transmission coil 5 can be terminated. Therefore, the safety of the cradle 1 can be improved.

Note that, in addition to such a termination control, the termination control may be carried out when an increased level of the above detected temperature reaches a predetermined level or more within a predetermined period of time, or on the basis of the absolute value of the detected temperature. In this case, furthermore, the supply of power to the primary transmission coil 5 can be terminated before an increase of temperature of the material mounted on the cradle 1 to the dangerous temperature. Therefore, the safety of the cradle 1 can be improved.

Furthermore, the cradle 1 may be further provided with a peripheral temperature-detecting element for detecting the temperature of the periphery of a portion corresponding to the primary transmission coil 5. Thus, the above termination control may be carried out when the following difference reaches a predetermined level. That is, the difference is between the temperatures detected by the above temperature-detecting element and unit 7, 8 (the temperature of the portion corresponding to the primary transmission coil 5) and the peripheral temperature detected by the above peripheral temperature-detecting element. In this case, furthermore, the supply of power to the primary transmission coil 5 can be terminated before the temperature of the mounted material of the cradle 1 reaches the dangerous temperature. Therefore, the stability of the cradle 1 can be improved.

Effects of Embodiment

As described above, the cradle 1 of the present embodiment detects the temperature of a mounted material on the cradle 1 by a temperature-detecting element 7 located at the optimal position obtained from various measurement results. The supply of power to the primary transmission coil 5 is terminated under control upon detecting an abnormal increase in temperature of the above mounted material. Therefore, an abnormal increase in temperature of the mounted material of the cradle 1 can be quickly controlled. As a result, the safety of the cradle 1 provided as a noncontact charging device can be improved.

In the description of the above embodiments, the embodiment of the present invention is applied to the cradle 1 for charging the mobile phone unit 2. Furthermore, any embodiment of the present invention may be applied to any charging device suitable for charging portable devices, such as personal handy-phone systems (PHSs), personal digital assistants (PDAs), portable game devices, and book-type personal computers. In this case, the same effects as those described above can be obtained.

Moreover, the description of the above embodiment is only provided as an example in accordance with present invention. Therefore, the present invention is not limited to the above embodiment. Within the scope of the gist of the present invention, additionally, various modifications may be allowed depending on designs and so on.

It should be understood by those skilled in the art that various modifications, combinations, sub-combinations, and alterations may occur, depending on design requirements and other factors, insofar as they are within the scope of the appended claims or the equivalents thereof.

What is claimed is:

1. A noncontact charging device, comprising:
 a mounting portion on which a device charged in a noncontact manner is mounted;
 a magnetic sheet;
 a flexible printed-circuit board;
 a primary transmission coil for supplying power to a secondary transmission coil provided to the device by the use of electromagnetic induction, the primary transmission coil disposed between and adhesively connected to the magnetic sheet and the flexible printed-circuit board;
 a spot-shaped temperature-detecting element formed as a temperature-detecting spot either embedded in the conductor pattern of the flexible printed-circuit board or disposed on and adhesively connected to and between the flexible printed-circuit board and the primary transmission coil; and
 control means for carrying out control of supplying power to the primary transmission coil and terminating the power supply to the primary transmission coil when a predetermined temperature is detected by the spot-shaped temperature-detecting element, wherein the primary transmission coil has an inner-most coil defining an inner coil diameter and extends radially outwardly therefrom to terminate in an outer-most coil defining an outer coil diameter to form an annular area of a plurality of primary transmission coil segments wrapped around in sequential contact with one another, and the spot-shaped temperature-detecting element extends, as viewed in cross-section, radially and contacts any one of the plurality of primary transmission coil segments in the annular area for detecting a temperature of the primary transmission coil segment at the location of contact.

2. A noncontact charging device according to claim 1, wherein the control means carries out control of acquiring a temperature detection output from the temperature-detecting element at predetermined intervals, detecting an amount of increase in temperature at the intervals, and terminating the power supply to the primary transmission coil when the amount of increase in temperature is equal to or more than a predetermined amount of increase in temperature.

3. A noncontact charging device according to claim 1, wherein the primary transmission coil includes a plurality of conductor patterns stacked on a flexible printed-circuit board.

4. A noncontact charging device according to claim 1, wherein each one of the plurality of primary transmission coil segments has a coil segment diameter as viewed in cross-section and the spot-shaped temperature-detecting element extends, as viewed in cross-section, radially at a distance approximately equal to the coil segment diameter.

5. A noncontact charging device, comprising:
a mounting portion on which a device charged in a noncontact manner is mounted;
a magnetic sheet;
a flexible printed-circuit board;
a primary transmission coil for supplying power to a secondary transmission coil provided to the device by the use of electromagnetic induction, the primary transmission coil disposed between and adhesively connected to the magnetic sheet and the flexible printed-circuit board;
a spot-shaped temperature-detecting element formed as a temperature-detecting spot either embedded in the conductor pattern of the flexible printed-circuit board or disposed on and adhesively connected to and between the flexible printed-circuit board and the primary transmission coil; and
a control unit configured to supply power to the primary transmission coil and terminate the power supply to the primary transmission coil when a predetermined temperature is detected by the spot-shaped temperature-detecting element, wherein the primary transmission coil has an inner-most coil defining an inner coil diameter and extends radially outwardly therefrom to terminate in an outer-most coil defining an outer coil diameter to form an annular area of a plurality of primary transmission coil segments wrapped around in sequential contact with one another, and the spot-shaped temperature-detecting element extends, as viewed in cross-section, radially and contacts any one of the plurality of primary transmission coil segments in the annular area for detecting a temperature of the primary transmission coil segment at the location of contact.

6. A noncontact charging device according to claim 5, wherein each one of the plurality of primary transmission coil segments has a coil segment diameter as viewed in cross-section and the spot-shaped temperature-detecting element extends, as viewed in cross-section, radially at a distance approximately equal to the coil segment diameter.

* * * * *